US012629667B2

(12) United States Patent
Tait, Jr. et al.

(10) Patent No.: US 12,629,667 B2
(45) Date of Patent: May 19, 2026

(54) DI-NITROGEN LIGANDS FOR SUPPORTED COORDINATED PLATINUM HYDROSILYLATION CATALYSTS

(71) Applicant: THE TRUSTEES OF INDIANA UNIVERSITY, Bloomington, IN (US)

(72) Inventors: Steven L. Tait, Jr., Bloomington, IN (US); Linxiao Chen, Issaquah, WA (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 96 days.

(21) Appl. No.: 17/921,010

(22) PCT Filed: Apr. 29, 2021

(86) PCT No.: PCT/US2021/029781
§ 371 (c)(1),
(2) Date: Oct. 24, 2022

(87) PCT Pub. No.: WO2021/222492
PCT Pub. Date: Nov. 4, 2021

(65) Prior Publication Data

US 2023/0125951 A1 Apr. 27, 2023

Related U.S. Application Data

(60) Provisional application No. 63/017,962, filed on Apr. 30, 2020.

(51) Int. Cl.

| | |
|---|---|
| ***B01J 31/18*** | (2006.01) |
| ***B01J 21/10*** | (2006.01) |
| ***B01J 37/02*** | (2006.01) |

(52) U.S. Cl.
CPC .......... *B01J 31/1815* (2013.01); *B01J 21/10* (2013.01); *B01J 37/0209* (2013.01); *B01J 2235/00* (2024.01); *B01J 2531/004* (2013.01); *B01J 2531/828* (2013.01)

(58) Field of Classification Search
None
See application file for complete search history.

(56) References Cited

U.S. PATENT DOCUMENTS

| | | | |
|---|---|---|---|
| 3,775,452 | A | 11/1973 | Karstedt |
| 5,241,034 | A | 8/1993 | Herzig |
| 6,207,766 | B1 | 3/2001 | Watabe |
| 6,444,775 | B1 | 9/2002 | Uyono |
| 6,531,540 | B1 | 3/2003 | O'Brien |

(Continued)

FOREIGN PATENT DOCUMENTS

WO 2018107169 A1 6/2018

OTHER PUBLICATIONS

Arabi et al. Journal of Molecular Structure, 1274, 2023, 134551 (Year: 2023).*

(Continued)

*Primary Examiner* — Yun Qian
(74) *Attorney, Agent, or Firm* — Barnes & Thornburg LLP

(57) ABSTRACT

The invention describes metal catalysts such as Pt single-site centers on metal oxide supports, e.g., powdered supports, such as MgO, $Al_2O_3$, $CeO_2$ or mixtures thereof with di-nitrogen containing ligands.

7 Claims, 10 Drawing Sheets

(56) References Cited

U.S. PATENT DOCUMENTS

| | | | | |
|---|---|---|---|---|
| 8,471,018 | B2 | 6/2013 | Yamanaka et al. | |
| 2017/0025699 | A1* | 1/2017 | Wang | C08J 5/225 |

OTHER PUBLICATIONS

Sommer, L., et al., Peroxide-catalyzed addition of trichlorosilane to 1-octene. J. Am. Chem. Soc. 1947, 69, 188-188.
Pierce, O. R., et al., Fluorosilicones as high temperature elastomers. J. Elastoplastics, vol. 3, (Apr. 1971), p. 82-96.
Marciniec, B., et al., Organosilicon Chemistry V—From Molecules to Materials. Wiley VCH, Weinheim 2003.—Book Reference.
Morita, Y., et al., Thermally initiated cationic polymerization and properties of epoxy siloxane. J. Appl. Polym. Sci. 2006, 100, 2010-2019.
Beyou, E., et al., New fluorinated polysiloxanes containing an ester function in the spacer. I. Synthesis and characterization. J. Polym. Sci., Part A: Polym. Chem. 1994, 32, 1673-1681.
Tojoiu, C., et al., Synthesis and photocrosslinking of benzyl acrylate substituted polydimethylsiloxanes. Eur. Polym. J. 2000, 36, 2115-2123.
Li, Z., et al., Synthesis and structural characterization of a new polysiloxane with second-order nonlinear optical effect. J. Appl. Polym. Sci. 2004, 94, 769-774.
Sellinger, A., et al., Palladium-and platinum-catalyzed coupling reactions of allyloxy aromatics with hydridosilanes and hydridosiloxanes: Novel liquid crystalline/organosilane materials. J. Polym. Sci., Part A: Polym. Chem. 1994, 32, 3069-3089.
Drazkowski, D.B., et al., Chemical substituent effects on morphological transitions in styrene-butadiene-styrene triblock copolymer grafted with polyhedral oligomeric silsesquioxanes. Macromolecules 2006, 39, 1854-1863.
Tuchbreiter, A., et al., "A posteriori" modification of carbosilane dendrimers and dendrons: their activation in core and branch positions. Dalton Trans. 2005, 1394-1402.
Troegel, D., et al., Recent advances and actual challenges in late transition metal catalyzed hydrosilylation of olefins from an industrial point of view. Coord. Chem. Rev. 2011, 255, 1440-1459.
Jerschow, P., Silicone elastomers; Smart Publications, 2001; vol. 137.—Book Reference.
Morris, R. H., Asymmetric hydrogenation, transfer hydrogenation and hydrosilylation of ketones catalyzed by iron complexes. Chem. Soc. Rev. 2009, 38, 2282-2291.
Anglotz, B.K., et al., Chiral bis (pyridylimino) isoindoles: A highly modular class of pincer ligands for enantioselective catalysis. Angew. Chem. Int. Ed. 2008, 47, 4670-4674. In Angew. Chem. 2008, 120, 4748-4752.
Bart, S.C., et al., Preparation and molecular and electronic structures of iron (0) dinitrogen and silane complexes and their application to catalytic hydrogenation and hydrosilation. J. Am. Chem. Soc. 2004, 126, 13794-13807.
Vankelecom, I., et al., Dense organic catalytic membranes for fine chemical synthesis. Catal. Today 2000, 56, 147-157. QD501 .C35 v.55-56 2000 B-ALF BTAA Print Archive (requested 10/31 1:13).
Xue, M., et al., Effect of triarylphosphane ligands on the rhodium-catalyzed hydrosilylation of alkene. Appl. Organomet. Chem. 2014, 28, 120-126.
Igarashi, M., et al., Ir-catalyzed hydrosilylation reaction of allyl acetate with octakis (dimethylsiloxy) octasilsesquioxane and related hydrosilanes. J. Organomet. Chem. 2014, 752, 141-146.
Dong, H., et al., Rhenium-mediated dehydrogenative silylation and highly regioselective hydrosilylation of nitrile substituted olefins. J. Organomet. Chem. 2014, 750, 17-22.
Wu, J.Y., et al., A strategy for the synthesis of well-defined iron catalysts and application to regioselective diene hydrosilylation. J. Am. Chem. Soc. 2010, 132, 13214-13216.
Glaser, P.B., et al., Catalytic hydrosilylation of alkenes by a ruthenium silylene complex. Evidence for a new hydrosilylation mechanism. J. Am. Chem. Soc. 2003, 125, 13640-13641.
Nozakura, S., et al. Cyanoethylation of Trichlorosilane. II. α-Addition. Bull. Chem. Soc. Jpn. 1956, 29, 326-331.
Bareille, L., et al., First Titanium-Catalyzed anti-1, 4-Hydrosilylation of Dienes. Organometallics 2005, 24, 5802-5806.
Harder, S., et al., Rational Design of a Well-Defined Soluble Calcium Hydride Complex. Angew. Chem. Int. Ed. 2006, 45, 3474-3478.
Speier, J.L., et al., The addition of silicon hydrides to olefinic double bonds. Part II. The use of group VIII metal catalysts. J. Am. Chem. Soc. 1957, 79, 974-979.
Galeandro-Diamant, T., et al., Platinum nanoparticles in suspension are as efficient as Karstedt's complex for alkene hydrosilylation. Chem. Commun. 2015, 51, 16194-16196.
Chauhan, B.P., et al., Regioselective Synthesis of Multifunctional Hybrid Polysiloxanes Achieved by Pt-Nanocluster Catalysis. J. Am. Chem. Soc. 2005, 127, 5790-5791.
Bai, Y., et al., Use of functionalized PEG with 4-aminobenzoic acid stabilized platinum nanoparticles as an efficient catalyst for the hydrosilylation of alkenes. J. Colloid Interface Sci. 2013, 394, 428-433.
Stein, J., et al., In situ determination of the active catalyst in hydrosilylation reactions using highly reactive Pt (0) catalyst precursors. J. Am. Chem. Soc. 1999, 121, 3693-3703.
Meister, T.K., et al., Platinum Catalysis Revisited—Unraveling Principles of Catalytic Olefin Hydrosilylation. ACS Catal. 2016, 6, 1274-1284.
Markó, I.E., et al., Selective and efficient platinum (0)-carbene complexes as hydrosilylation catalysts. Science 2002, 298, 204-206.
Markó, I.E., et al., Highly Active and Selective Platinum(0)-Carbene Complexes. Efficient, Catalytic Hydrosilylation of Functionalised Olefins. Adv. Synth. Catal. 2004, 346, 1429-1434.
Bernhammer, J.C., et al., Platinum (II) complexes with thioether-functionalized benzimidazolin-2-ylidene ligands: Synthesis, structural characterization, and application in hydroelementation reactions. Organometallics 2013, 33, 172-180.
Dunsford, J.J., et al., Expanded ring N-heterocyclic carbene complexes of zero valent platinum dvtms (divinyltetramethyldisiloxane): Highly efficient hydrosilylation catalysts. J. Organomet. Chem. 2011, 696, 188-194.
Taige, M.A., et al., Platinum (II)-bis-(N-heterocyclic carbene) complexes: synthesis, structure and catalytic activity in the hydrosilylation of alkenes. J. Organomet. Chem. 2011, 696, 2918-2927.
Sabourault, N., et al., Platinum oxide (PtO2): a potent hydrosilylation catalyst. Org. Lett. 2002, 4, 2117-2119.
Chen, Y.J., et al., Discovering Partially Charged Single-Atom Pt for Enhanced Anti-Markovnikov Alkene Hydrosilylation. J. Am. Chem. Soc. 2018, 140, 7407-7410.
Zhu, Y., et al., One-Pot Pyrolysis to N-Doped Graphene with High-Density Pt Single Atomic Sites as Heterogeneous Catalyst for Alkene Hydrosilylation. ACS Catal. 2018, 8, 10004-10011.
Cui, X., et al., Synthesis of Single Atom Based Heterogeneous Platinum Catalysts: High Selectivity and Activity for Hydrosilylation Reactions. ACS Central Science 2017, 3, 580-585.
Huang, Z., et al., Catalytically Active Single-Atom Sites Fabricated from Silver Particles. Angew. Chem. 2012, 124, 4274-4279.
Fako, E., et al., Comparative single atom heterogeneous catalysts (SAHCs) on different platforms: a theoretical approach. Catal. Sci. Technol. 2017, 7, 4285-4293.
Chen, Y.X., et al., Fabrication, characterization, and stability of supported single-atom catalysts. Catalysis Science & Technology 2017, 7, 4250-4258.
Vilé, G., et al., A Stable Single-Site Palladium Catalyst for Hydrogenations. Angew. Chem. Int. Ed. 2015, 54, 11265-11269.
Xu, W., et al., Single-site SBA-15 supported zirconium catalysts. Synthesis, characterization and toward cyanosilylation reaction Single-site SBA-15 supported zirconium catalysts. Synthesis, characterization and toward cyanosilylation reaction. Appl. Surf. Sci. 2015, 325, 227-234.
Ji, P., et al., Single-Site Cobalt Catalysts at New Zr8 (μ2-0)8 (μ2-OH)4 Metal-Organic Framework Nodes for Highly Active Hydrogenation of Alkenes, Imines, Carbonyls, and Heterocycles. J. Am. Chem. Soc. 2016, 138, 12234-12242.

(56) References Cited

OTHER PUBLICATIONS

Schweitzer, N.M., et al., Propylene Hydrogenation and Propane Dehydrogenation by a Single-Site Zn2+ on Silica Catalyst. ACS Catal. 2014, 4, 1091-1098.
Sohn, H., et al., Isolated, well-defined organovanadium (III) on silica: single-site catalyst for hydrogenation of alkenes and alkynes. Chem. Commun. 2017.
Skomski, D., et al., Two- and Three-Electron Oxidation of Single-Site Vanadium Centers at Surfaces by Ligand Design. J. Am. Chem. Soc. 2015, 137, 7898-7902.
Skomski, D., et al., Redox-active on-surface polymerization of single-site divalent cations from pure metals by a ketone-functionalized phenanthroline. J. Chem. Phys. 2015, 142, 101913.
Skomski, D., et al., Redox-Active On-Surface Assembly of Metal-Organic Chains with Single-Site Pt(II). J. Am. Chem. Soc. 2014, 136, 9862-9865.
PCT International Search Report and Written Opinion completed by the ISA/US on Jun. 25, 2021 and issued in connection with PCT/US2021/029781.
(Chen, Let al.) Alkene Hydrosilylation on Oxide-Supported Pt-Ligand Single-Site Catalysts. ChemCatChem. Jun. 2019, Epub Apr. 25, 2019, vol. 11, No. 12; pp. 2843-2854.
(Goossen, LJ et al.) Cu-Catalyzed Protodecarboxylation of Aromatic Carboxylic Acids. Poster (online). 2007 [retrieved on Jun. 24, 2021].
(Abel, AS et al.) 1, 10-Phenanthroline Carboxylic Acids for Preparation of Functionalized Metal-Organic Frameworks. Asian Journal of Organic Chemistry. Nov. 2019, vol. 8, No. 11; pp. 2128-2142.
(Coulston, KJ) Solvent Extraction by Alkyl Bipyridines. Master's Thesis (online). Oct. 1980 [retrieved on Jun. 24, 2021].
(Hewat, T et al.) Varying Numners and Positions of Carboxylate Groups on Ru Dyes for Dye-Sensitized Solar Cells: Uptake to TiO2, Cell Performance and Cell Stability. RSC Advances. Feb. 7, 2014, vol. 4; pp. 10165-10175.
(Hara, Ket al.) New Ru(II) phenanthroline complex photosensitizers having different number of carboxyl groups for dye-sensitized solar cells. Journal of Photochemistry and Photobiology A: Chemistry. Nov. 29, 2001, vol. 145, Nos. 1-2; pp. 117-122.
(Calogero, Get al.) Vegetable-based Dye-Sensitized Solar Cells. Chemical Society Reviews. Apr. 9, 2015, vol. 44, No. 10; pp. 3244-3294.
(Wang, Ket al.) In Situ One-Step Synthesis of Platinum Nanoparticles Supported on Metal-Organic Frameworks as an Effective and Stable Catalyst for Selective Hydrogenation of 5 Hydroxymethylfurfural. ACS Omega. Jun. 25, 2020, vol. 5, No. 26; pp. 16183-16188.
(Coe, BJ et al.) Synthesis and properties of new mononuclear Ru(ii)-based photocatalysts containing 4,4 -diphenyl-2,2-bipyridyl ligands. Dalton Transactions. Feb. 10, 2016, vol. 45, No. 12; pp. 5210-5222.
(Chen, Let al.) Synthesis of platinum single-site centers through metal-ligand self-assembly on powdered metal oxide supports. Journal of Catalysis. Sep. 2018, vol. 365; pp. 303-312.
Tempas, C.D., et al., Redox Isomeric Surface Structures Are Preferred over Odd-Electron Pt1+. Chem. Eur. J. 2018, 24, 15852-15858.
Williams, C.G., et al., Metal-Ligand Complexation through Redox Assembly at Surfaces Characterized by Vibrational Spectroscopy. J. Phys. Chem. C 2017.
Morris, T.W., et al., Multi-electron Reduction Capacity and Multiple Binding Pockets in Metal-Organic Redox Assembly at Surfaces. Chem. Eur. J. 2019, 25, 5565-5573.
Chen, L., et al., Synthesis of platinum single-site centers through metal-ligand self-assembly on powdered metal oxide supports. J. Catal. 2018, 365, 303-312.
Chen, L., et al., Alkene Hydrosilylation on Oxide-Supported Pt-Ligand Single-Site Catalysts. ChemCatChem 2019, 11, 2843-2854.
Chen, L., et al., Sulfate promotion of selective catalytic reduction of nitric oxide by ammonia on ceria. Catalysis Science & Technology 2019, 9, 1802-1815.
Iimura, T., et al., A Dialkylsilylene-Pt(0) Complex with a DVTMS Ligand for the Catalytic Hydrosilylation of Functional Olefins, Organometallics, 35 (2016) 4071-4076.
Chen, L., et al., Bidentate N-based Ligands for Highly Reusable, Ligand-coordinated, Supported Pt Hydrosilylation Catalysts, ChemCatChem, 12 (2020) 3576-3584. Accepted Article, DOI: 10.1002/cctc.202000085.
Tait, S.L., et al., Metal-Organic Coordination Interactions in Fe-Terephthalic Acid Networks on Cu(100), J. Am. Chem. Soc., 130 (2008) 2108-2113.
Skomski, D., et al., Robust Surface Nano-Architecture by Alkali-Carboxylate Iolonic Bonding, Journal of the American Chemical Society, 134 (2012) 14165-14171.
Ozer, D., et al., Synthesis and Characterization of Boric Acid Mediated Metal-organic Frameworks Based on Trimesic Acid and Terephthalic Acid, Journal of Molecular Structure, 1141 (2017) 261-267.
Stepanow, S., et al., Deprotonation-Driven Phase Transformations in Terephthalic Acid Self-Assembly on Cu(100), J. Phys. Chem. B, 108 (2004) 19392-19397.
Burns, F., et al., X-ray photoelectron spectroscopy of cadmium arachidate monolayers on various metal surfaces, J. Phys. Chem., 86 (1982) 5123-5127.
Russat, J., Characterization of polyamic acid/polyimide films in the nanometric thickness range from spin-deposited polyamic acid, Surf. Interface Anal., 11 (1988) 414-420.
Troughton, E.B., et al., Monolayer films prepared by the spontaneous self-assembly of symmetrical and unsymmetrical dialkyl sulfides from solution onto gold substrates: structure, properties, and reactivity of constituent functional groups, Langmuir, 4 (1988) 365-385.
Taguchi, M., et al., Supercritical hydrothermal synthesis of hydrophilic polymer-modified water-dispersible CeO2 nanoparticles, CrystEngComm, 13 (2011) 2841-2848.
Cheng, G., et al., Preparation of P(St-co-MAA)/CeO2 composite microspheres via surface carboxyl oxidation followed by in situ chemical deposition of CeO2 and their catalytic application on oxidative degradation of methyl orange, RSC Adv., 4 (2014) 29042-29049.
Taguchi, M., et al., Growth Mechanism and Surface Chemical Characteristics of Dicarboxylic Acid-Modified CeO2 Nanocrystals Produced in Supercritical Water: Tailor-Made Water-Soluble CeO2 Nanocrystals, Cryst. Growth Des., 9 (2009) 5297-5303.
Schmidt, J.J., et al., Surface studies of polymer blends. 2. An ESCA and IR study of poly (methyl methacrylate)/poly (vinyl chloride) homopolymer blends, Macromolecules, 22 (1989) 4489-4495.
Onishi, H., et al., Adsorption of Na atoms and oxygen-containing molecules on MgO(100) and (111) surfaces, Surf. Sci., 191 (1987) 479-491.
Kallury, K.M.R., et al., Covalent binding of amino, carboxy, and nitro-substituted aminopropyltriethoxysilanes to oxidized silicon surfaces and their interaction with octadecanamine and octadecanoic acid studied by X-ray photoelectron spectroscopy and ellipsometry, J. Adhes. Sci. Technol., 5 (1991) 801-814. TN:2145099—OCLC.
Pakharukova, V.P., et al., Alumina-supported platinum catalysts: Local atomic structure and catalytic activity for complete methane oxidation, Appl. Catal. A, 486 (2014) 12-18.
Beck, I.E., et al., Platinum nanoparticles on Al2O3: Correlation between the particle size and activity in total methane oxidation, J. Catal., 268 (2009) 60-67.
Maciejewski, H., et al., Silicone waxes—synthesis via hydrosilylation in homo-and heterogeneous systems. J. Mol. Catal. A: Chem. 2006, 257, 141-148.
Ganicz, T., et al., Novel liquid crystalline resins based on MQ siloxanes. J. Organomet. Chem. 2006, 691, 5052-5055.
Boury, B., et al., Poly (vinylsilane): a precursor to silicon carbide. 1. Preparation and characterization. Organometallics 1991, 10, 1457-1461.
Mori, A., et al., A facile preparation and polymerization of 1, 1-difunctionalized disiloxanes. Chem. Lett. 1996, 25, 517-518.
Marciniec, B., et al., New Bis (dialkynyldisiloxane) triplatinum (0) cluster: synthesis, structure, and catalytic activity in plefin-hydrosilylation reactions. ChemCatChem 2012, 4, 1935-1937.

(56) References Cited

OTHER PUBLICATIONS

Downing, C. M., et al., Diethyl sulfide stabilization of platinum-complex catalysts for hydrosilylation of olefins. Catal. Commun. 2011, 12, 1166-1169.
Mantovani, K. M., et al., Unusual catalytic activity after simultaneous immobilization of two metalloporphyrins on hydrozincite/nanocrystalline anatase. J. Catal. 2017, 352, 442-451.
Rimoldi, M., et al., A stable 16-electron iridium(III) hydride complex grafted on SBA-15: a single-site catalyst for alkene hydrogenation. Chem. Comm. 2013, 49, 11314-11316.
Xu, W., et al. Ligand-tailored single-site silica supported titanium catalysts: Synthesis, characterization and towards cyanosilylation reaction. J. Solid State Chem. 2015, 221, 208-215.
Chen, L., et al., A molecular Pd (II) complex incorporated into a MOF as a highly active single-site heterogeneous catalyst for C—Cl bond activation. Green Chemistry 2014, 16, 3978-3985.
Qiao, B., et al., Single-atom catalysis of CO oxidation using Pt1/FeOx. Nature chemistry 2011, 3, 634-641.
Li, Z., et al., Well-Defined Materials for Heterogeneous Catalysis: From Nanoparticles to Isolated Single-Atom Sites. Chem. Rev. 2019.
DeRita, L., et al., Catalyst Architecture for Stable Single Atom Dispersion Enables Site-Specific Spectroscopic and Reactivity Measurements of CO Adsorbed to Pt Atoms, Oxidized Pt Clusters, and Metallic Pt Clusters on TiO2. J. Am. Chem. Soc. 2017, 139, 14150-14165.
Iu, J., Catalysis by Supported Single Metal Atoms. ACS Catal. 2017, 7, 34-59.
Cui, X., et al., Bridging homogeneous and heterogeneous catalysis by heterogeneous single-metal-site catalysts. Nat. Catal. 2018, 1, 385-397.
Liu, L., et al., Determination of the Evolution of Heterogeneous Single Metal Atoms and Nanoclusters under Reaction Conditions: Which Are the Working Catalytic Sites? ACS Catal. 2019, 10626-10639.
Leich, V., et al., Hydrosilylation catalysis by an earth alkaline metal silyl; synthesis, characterization, and reactivity of bis (triphenylsilyl) calcium, Chem. Commun. 2014, 50, 2311-2314.

* cited by examiner (a)

(b)

DI-NITROGEN LIGANDS FOR SUPPORTED COORDINATED PLATINUM HYDROSILYLATION CATALYSTS

CROSS REFERENCE TO RELATED APPLICATIONS

This application is a U.S. national counterpart application of international application serial No. PCT/US2021/029781 filed Apr. 29, 2021, which claims priority to U.S. Provisional Application 63/017,962 filed on Apr. 30, 2020, the disclosures of which are hereby expressly incorporated by reference in their entireties.

STATEMENT OF GOVERNMENT SUPPORT

This invention was made with government support under DE-SC0016367 awarded by Department Of Energy. The government has certain rights in the invention.

FIELD OF THE INVENTION

The invention relates generally to metal catalysts such as Pt single-site centers on metal oxide supports, e.g., powdered supports, such as MgO, $Al_2O_3$, $CeO_2$ or mixtures thereof with di-nitrogen containing ligands.

BACKGROUND OF THE INVENTION

Hydrosilylation, the addition of a Si—H bond to a multiple bond (particularly C═C, Scheme 1), has been of significant importance in silicon chemistry since its first report in 1947.[1] It serves as a versatile tool to produce various functionalized silicon-based polymers,[2-10] which have observed wide applications as lubricant oils[11] and as coating,[12-14] preceramic,[15-16] adhesive,[17-18] and sealing materials.[19-20] Hydrosiylation also offers solutions to silicone curing[12-21] and Si—C bond building in fine chemical synthesis.[22-25] Industrial hydrosilylation catalysts have long been dominated by homogeneous Pt complexes due to their superior activity over other metals.[26-34] Speier catalyst, $H_2PtCl_6$/Pr—OH,[35] prevailed for decades before being replaced by the more active and selective Karstedt catalyst, a vinyl-siloxane $Pt^0$ complex developed in 1970s.[36] One significant drawback of Karstedt catalyst is the formation of colloidal Pt, which deactivates the catalyst and reduces product quality.[12, 37-41] The problem is further underscored by the high cost, volatile market, and uncertain future supply of Pt. Besides the Pt aggregation problem, side reactions of C═C isomerization and hydrogenation (Scheme 1) are difficult to avoid, and some important functional groups, such as epoxy,[42-43] are unstable under reaction conditions. Consequently, there is ongoing research effort to develop Pt hydrosilylation catalysts with improved selectivity and stability. Examples of recent progress include Pt-carbene complexes,[42-46] trinuclear alkyne $Pt^0$ complexes,[47] and anti-sulfur-poisoning Pt catalysts.[48] Heterogeneous Pt catalysts, such as Pt nanoparticles,[37-39] $PtO_2$,[49] and supported Pt single-atoms,[50-52] have also inspired interest because they can be easily separated from the reaction mixture and recycled.

Scheme 1. General reaction scheme of hydrosilylation and common byproducts from alkene.

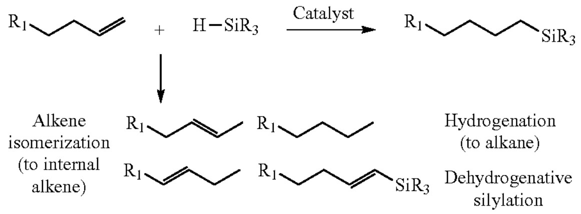

Therefore, a need exists for catalysts and processes that overcome one or more of the current disadvantages noted above.

BRIEF SUMMARY OF THE INVENTION

The quest has long existed for next-generation catalysts that combine the easy recovery of heterogeneous catalysts with the high metal utilization efficiency and selectivity of homogeneous catalysts. This has sparked growing interest in immobilized organometallic catalysts[53-56] and single-atom catalysts (SACs).[57-70] Both groups of catalysts fulfill the purpose of isolating single metal atoms on solid supports. The former offers higher metal loading and tunability, while the latter provides direct metal-support interaction, which is often crucial in catalysis. To combine desirable characters from both, a metal-ligand self-assembly strategy was developed, first on single crystal surfaces in UHV[71-76] and then adapted to various high-surface-area oxide supports under ambient conditions[77-78] to create high-loading of ligand-stabilized and tunable noble metal sites with direct contact with the support. It was demonstrated that Pt stabilized by 3,6-di-2-pyridyl-1,2,4,5-tetrazine (DPTZ, FIG. 1*a*) on $CeO_2$ and MgO powders are atomically dispersed as $Pt^{2+}$,[77] and are much more active than supported Pt aggregates and existing Pt SACs for alkene hydrosilylation.[50-5, 78] Compared with the Karstedt catalyst, they improve selectivity, reduce Pt aggregation, and suppress the decomposition of epoxy groups.[77-78] Despite desired catalytic properties, Pt active sites on these catalysts partially leach into the solution during catalysis, limiting their recyclability and, hence, practical applications.

Therefore, a series of bifunctional bidentate N-based ligands (FIGS. 1*b*-*e*), aiming to create supported Pt-ligand hydrosilylation catalysts with improved active site recyclability were introduced. Three approaches are discussed: replacing DPTZ with a different ligand, mixing DPTZ with another ligand, and pre-depositing an additional ligand as the “anchoring ligand.” The resulting Pt catalysts are evaluated with a model hydrosilylation reaction between 1-octene and dimethoxymethyl silane. All three approaches are promising to mitigate the active site leaching problem, and present two catalysts with excellent reusability through multiple reaction cycles. Post-reaction characterization sheds light on the nature of active sites on these two catalysts. This work not only significantly improves the application potential of supported Pt-ligand hydrosilylation catalysts, it also expands the tool box for the synthesis of highly-dispersed noble metal catalysts on oxide supports.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

Figure 1:
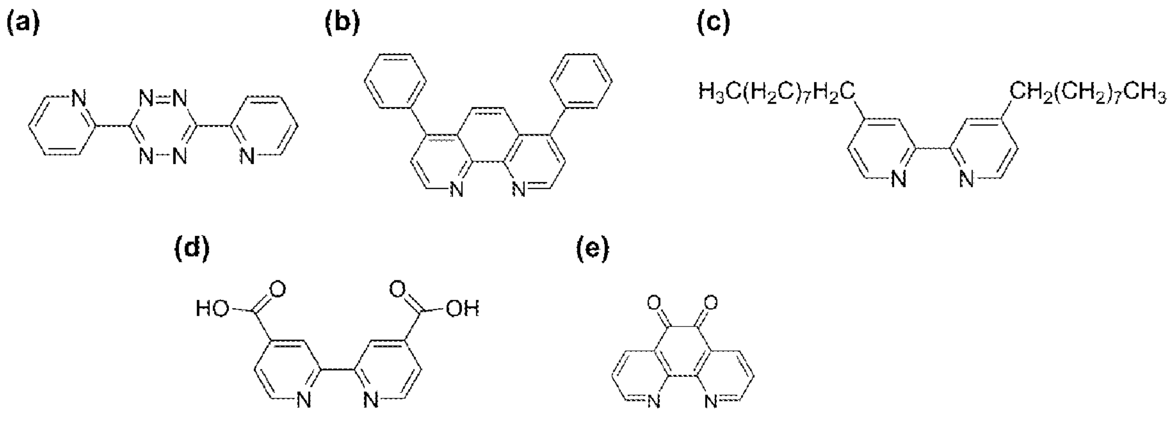
FIG. 1 depicts structures of bidentate N-based ligands used in this work: (a) 3,6-(2-pyridyl)-1,2,4,5-tetrazine (DPTZ), (b) bathophenanthroline (BPhen), (c) 4,4'-dinonyl-2,2'-dipyridyl (C9BP), (d) 2,2'-bipyridine-4,4'-dicarboxylic acid (4,4'-BPDCA), and (e) 1,10-Phenanthroline-5,6-Dione (PDO).

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following paragraphs enumerated consecutively from 1 through 15 provide for various aspects of the present invention. In one embodiment, in a first paragraph (1), the present invention provides a supported platinum catalyst system comprising: (a) a di-nitrogen ligand to complex with (b) a platinum metal ion and (c) a support, wherein the di-nitrogen ligand comprises the formula:

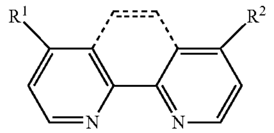

wherein $R^1$ and $R^2$ are each, independently, a $C_3$ to a $C_{12}$ branched or unbranched alkyl group, a substituted or unsubstituted phenyl group or a carboxylic acid group; and the biphenyl rings can, optionally, form a third ring to form a phenanthroline ring system.

2. The supported platinum catalyst system of paragraph 1, wherein $R^1$ and $R^2$ are both an unbranched $C_9$ alkyl group.

3. The supported platinum catalyst system of paragraph 1, wherein $R^1$ and $R^2$ are both an unsubstituted phenyl group.

4. The supported platinum catalyst system of paragraph 1, wherein $R^1$ and $R^2$ are both carboxylic acid.

5. The supported platinum catalyst system of any of paragraphs 1 through 4, wherein the support comprises MgO, $Al_2O_3$, $CeO_2$ or mixtures thereof.

6. A process comprising:

(a) providing a supported catalyst system of any of paragraphs 1 through 5;

(b) contacting the supported catalyst system, a vinyl terminated alkene and a hydrosilylation agent under hydrosilylation conditions; and (c) hydrosilylating the vinyl terminated alkene to form a hydrosilylated alkyl product.

7. The process of paragraph 6, wherein the support comprises MgO, $Al_2O_3$, $CeO_2$ or mixtures thereof.

8. The process of either paragraphs 6 or 7, wherein the vinyl terminated alkene is 1-octene 9. The process of any of paragraphs 6 through 8, wherein the hydrosilylation agent comprises dimethoxymethylsilane.

10. A supported platinum catalyst system comprising: (a) a di-nitrogen ligand to complex with (b) a platinum metal ion and (c) a support, wherein the di-nitrogen ligand comprises the formula:

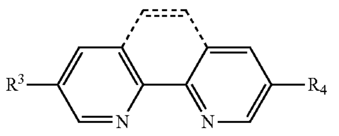

wherein $R^3$ and $R^4$ are each acarboxylic acid group; and the biphenyl rings can form a third ring to form a phenanthroline ring system.

11. The supported platinum catalyst system of paragraph 10, wherein the support comprises MgO, $Al_2O_3$, $CeO_2$ or mixtures thereof.

12. A process comprising:

(a) providing a supported catalyst system of paragraphs 10 or 11;

(b) contacting the supported catalyst system, a vinyl terminated alkene and a hydrosilylation agent under hydrosilylation conditions; and (c) hydrosilylating the vinyl terminated alkene to form a hydrosilylated alkyl product.

13. The process of paragraph 12, wherein the support comprises MgO, $Al_2O_3$, $CeO_2$ or mixtures thereof.

14. The process of either paragraphs 12 or 13, wherein the vinyl terminated alkene is 1-octene 15. The process of any of paragraphs 12 through 14, wherein the hydrosilylation agent comprises dimethoxymethylsilane.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Synthesis of Pt-ligand/$CeO_2$ with single bidentate N-based ligand. For Pt-BPhen/$CeO_2$: 0.0153 g (0.046 mol) BPhen (Sigma Aldrich, 97%) were dissolved in 25 mL 1-butanol by stirring for 20 min at room temperature. 0.3 g $CeO_2$ (BET surface area: 4.8 $m^2/g$) were added to the BPhen solution and the mixture was then stirred for 2 h at room temperature. 0.0080 g $H_2PtCl_6.6H_2O$ (Alfa Aesar, 99.95% metal basis, 0.015 mol, 1 wt % by Pt with respect to total catalyst mass; 3 eq. BPhen with Pt) were dissolved in 5 mL 1-butanol. The Pt salt solution was then added to the $CeO_2$/BPhen/1-butanol mixture dropwise under stirring within 30 min The mixture was covered and stirred for 24 h, then dried at room temperature under dry air flow overnight. The dried catalyst was washed with water, then dichloromethane (DCM) until all free BPhen were removed.

For Pt-C9BP/$CeO_2$ and Pt-4,4'-BPDCA/$CeO_2$: the same procedure was followed, except that BPhen was replaced by C9BP (Alfa Aesar, 97%) or 4,4'-BPDCA (Alfa Aesar, 98%) and $H_2O$ was used instead of 1-butanol as the solvent in the case of 4,4'-BPDCA due to ligand solubility. All Pt-ligand catalysts are light-yellow powders.

Synthesis of Pt-BPhen+DPTZ/$CeO_2$. The synthesis of Pt-BPhen+DPTZ/$CeO_2$ follows a similar procedure as Pt-BPhen/$CeO_2$ with the following changes: 2/3 of BPhen (0.031 mol out of 0.046 mol) were replaced by DPTZ (Sigma Aldrich, 96%) for a 1:2 BPhen:DPTZ molar ratio. Pt-BPhen+DPTZ/$CeO_2$ catalyst is a light-yellow powder.

Synthesis of supported Pt-DPTZ catalysts with anchoring-ligand-modified oxides. In the first step, 0.07 mmol anchoring ligand was impregnated onto 0.5 g $CeO_2$ or MgO (BET surface area: 5.1 $m^2/g$) in a solvent ($H_2O$ for PDO and DCM for 4,4'-BPDCA), using a method from a previous report.[79] The anchoring-ligand-modified support was then washed with the corresponding solvent to remove free anchoring ligand and dried at 60° C. overnight. In the second step, Pt-DPTZ catalysts were synthesized following a similar procedure with Pt-BPhen/$CeO_2$, with the following changes: BPhen were replaced by DPTZ, and pristine $CeO_2$ were replaced by anchoring-ligand-modified $CeO_2$ or MgO.

General Procedures for Alkene Hydrosilylation Reactions.

For the 70° C., 30 min reactions: 30 mg supported Pt catalysts were weighed and kept in an empty reaction tube with cap. 5 mmol dimethoxymethylsilane (Alfa Aesar, >97%) and 6 mmol 1-octene (Alfa Aesar, >97%) were weighed into another reaction tube, and 3 mL toluene (Macron, ACS grade) was added to the same tube. For the 60° C., 20 min reactions, the amount of all chemicals was reduced to half. Both tubes were pre-heated in a water bath at the reaction temperature for 10 min, before reactants and solvent were added into the tube with Pt catalysts. The tube was capped during the reaction to avoid evaporation of silane (low boiling point). After the reaction, the tube was cooled down quickly with cold water flow, the solid catalysts were centrifuged out for reuse or post-reaction characterization, and the liquid mixture was diluted to 25 mL for GC-MS measurements with an Agilent 6890N Gas Chromatograph and 5973 Inert Mass Selective Detector. Product yield was calculated from its response intensity at m/z=203.2 with respect to the response of internal standard decane (Sigma Aldrich, >99%, 0.15 g added to all standard and post-reaction solutions) at m/z=142.2 using calibration curves pre-made with standard solutions. The product used to make standard solutions was purchased from Sigma Aldrich (>95.0%). The calibration curve exhibits an almost-perfect linear relationship between normalized GC-MS response and concentration over the concentration range relevant to the experiments reported here. For all samples measured, the GC-MS response from decane is within 20% of standard solutions used in the calibration curves. Epoxy-containing alkene substrate hydrosilylation reactions occurred under 80° C., 100 min conditions with 50 mg supported Pt catalyst weighed and kept in an empty reaction tube. 2.5 mmol trimethoxysilane (Sigma Aldrich, 95%) and 3 mmol 4-vinyl-1-cyclohexene 1,2-epoxide isomers (Sigma Aldrich, 98%) were weighed into another reaction tube, and 1.5 mL toluene (Macron, ACS grade) was added to the same tube.

Characterization of Supported Coordinated Pt Catalysts.

X-ray photoelectron spectroscopy (XPS) measurements were performed with a PHI Versaprobe II XP spectrometer using a monochromated Al X-ray source. A small amount of each powder sample was fixed onto a platen with double-sided tape. For $CeO_2$-supported samples, XPS were collected at Pt 4f, N 1s, C 1s, Cl 2p, Ce 3d, and O 1s regions. For MgO-supported samples, the Ce 3d region was replaced by the Mg 2p region. A neutralizer was used to alleviate surface charging. The binding energy was corrected by calibration with the adventitious C is peak (284.8 eV). Inductively coupled plasma mass spectrometry (ICP-MS) measurements were performed with an Agilent 7700 quadrupole ICP-MS instrument. Solid catalysts were treated with aqua regia to dissolve all Pt before measurement. For solution samples, the solvent was evaporated first and then the residue was treated with aqua regia.

Results and Discussions

1. Supported Coordinated Pt Catalysts with Single Bidentate N-Based Ligand

Oxide-supported Pt-DPTZ catalysts were previously prepared. Extensive characterization showed that Pt exist predominantly as isolated atoms stabilized by favorable Pt-DPTZ coordination, with direct contact with oxide supports. Therefore, these catalysts have been categorized as single-atom catalysts (SACs).[77-78] The SACs exhibit improvements over the commercial hydrosilylation catalyst (Karstedt catalyst) in selectivity, stability, and substrate scope. Nevertheless, their applications are challenged by low reusability due to active site leaching into solution during reaction. It was established that Pt-DPTZ coordination through the bidentate N binding pockets (FIG. 1*a*) is stable, but the binding between Pt-DPTZ complexes and supports is not.[78] Consequently, efforts first replaced DPTZ with one of the following bifunctional bidentate N-based ligands: bathophenanthroline (BPhen), 4,4'-dinonyl-2,2'-dipyridyl (C9BP), or 2,2'-bipyridine-4,4'-dicarboxylic acid (4,4'-BPDCA) (structures shown as FIG. 1*b-d*). Besides a bidentate N pocket, each ligand has additional functional groups for improved interaction with the oxide supports. Not to be limited by theory, the replacement enhances the interaction between the Pt-ligand complex and the support to create active hydrosilylation catalysts with improved active site recyclability.

Figure 2:
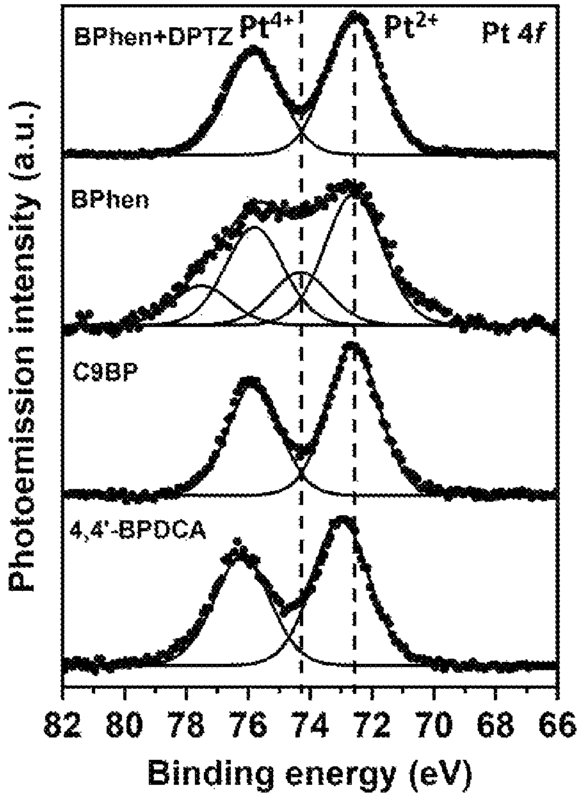
FIG. 2 depicts X-ray photoelectron (XP) spectra of fresh $CeO_2$-supported Pt-ligand LCSCs in the Pt 4f region. All spectra are normalized so that peaks have similar intensity for better peak shape comparison. All spectra except for Pt-BPhen/$CeO_2$ show a single $Pt^{2+}$ components (~72.8 eV). For Pt-BPhen/$CeO_2$, a small fraction of $Pt^{4+}$ is also present.
Figure 3:
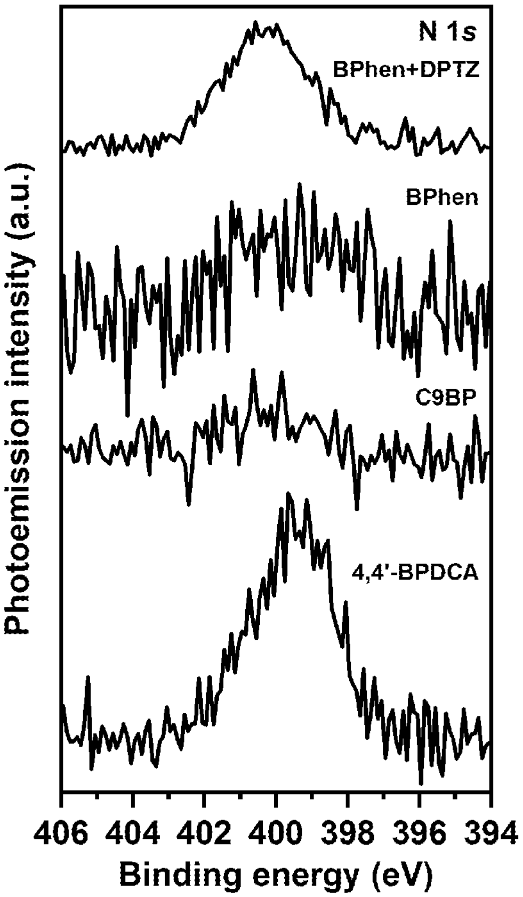
FIG. 3 provides XP spectra of $CeO_2$-supported Pt-ligand LCSCs in N 1s region. All spectra are normalized based on Pt 4f peak area so that peak size reflects the relative concentration of N with Pt (N:Pt ratio) on the catalyst.
Figure 4:
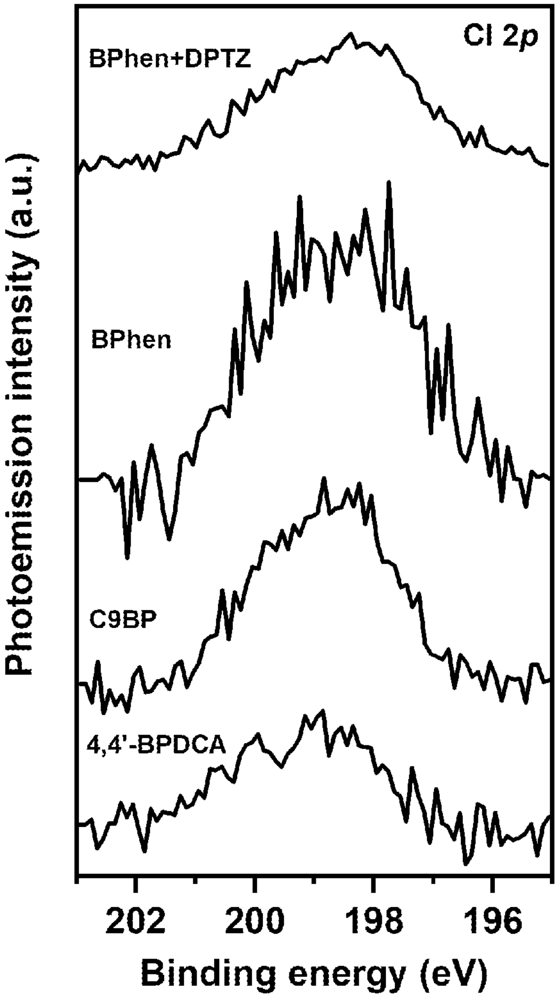
FIG. 4 provides XP spectra of $CeO_2$-supported Pt-ligand catalysts in Cl 2p region. All spectra are normalized based on Pt 4f peak area so that peak size reflects the relative concentration of Cl with Pt (Cl:Pt ratio) on the catalyst.

Supported Pt-ligand catalysts were synthesized using the one-step impregnation method reported previously[77] and discussed above (see experimental section). $CeO_2$ was chosen as the support because, in previous studies, it was found higher catalytic activity and reusability with $CeO_2$ than with other oxide supports.[77-78] Synthesis solvent was varied to ensure simultaneous dissolution of $H_2PtCl_6.6H_2O$ and the ligand (Table 1). 1 wt % Pt was added and the actual Pt loading, determined by inductively coupled plasma mass spectrometry (ICP-MS), was found to be in the range of 0.16-0.41 wt % (Table 1). On all fresh catalysts, the binding energy (BE) of Pt $4f_{7/2}$ X-ray photoelectron spectroscopy (XPS) peak is consistent with $Pt^{2+}$ (~72.8 eV, Table 1 and FIG. 2). FIG. 2 also shows that Pt 4f XP spectra on most catalysts can be described with a single $Pt^{2+}$ component of similar FWHM (full width at half maximum) (~2.1 eV), except for Pt-BPhen/$CeO_2$, on which the wide, asymmetric peak requires an additional $Pt^{4+}$ component for appropriate fitting. Therefore, most Pt exist as dispersed $Pt^{2+}$ cations and metallic Pt nanoparticles are not present. This is expected because the bidentate N pockets are suitable for Pt coordination and have sufficient oxidizing potential to stabilize dispersed single-atom $Pt^{2+}$ on $CeO_2$, as demonstrated previously.[77-78] On all catalysts, N (from ligands) and Cl (from $H_2PtCl_6.6H_2O$) are identified by XPS (FIGS. 3 and 4). N:Pt and Cl:Pt ratios are calculated from XPS peak areas and summarized in Table 1. The sum of the two ratios is at least 3, indicating Pt are highly coordinated with N and Cl. Pt atoms also coordinate with O from $CeO_2$ to stay on the support. The high coordination is consistent with the argument that Pt aggregates are not formed to a significant degree. In summary, XPS indicates that on these catalysts, Pt bind with ligands, Cl, and O from $CeO_2$, forming highly dispersed $Pt^{2+}$ sites. It was noted that these XPS results are consistent with previous studies of Pt-DPTZ SACs,[77] for which EXAFS and STEM analysis supported a single-atom character of the metal sites, which implies that atomic dispersion is likely on the other catalysts reported here. However, due to a lack of comprehensive characterization, these are referred to as ligand-coordinated supported catalysts (LCSCs), rather than SACs.

TABLE 1

Synthesis and characterization of fresh $CeO_2$-supported Pt-ligand catalysts for a series of ligands. Pt loading is calculated as wt % from ICP-MS. From XPS analysis, Pt $4f_{7/2}$ binding energy (BE) was measured and molar ratios of N:Pt and Cl:Pt, calculated from peak area ratios, corrected for sensitivity factors.

| Ligand | ICP Pt loading (wt %) | Pt $4f_{7/2}$ BE (eV) | N:Pt | Cl:Pt | Synthesis solvent |
|---|---|---|---|---|---|
| DPTZ[a] | 0.35 | 72.8 | 2.8 | 1.0 | 1-butanol |
| Bphen + DPTZ[b] | 0.53 | 72.7 | 2.5 | 1.5 | 1-butanol |
| BPhen | 0.29 | 72.8 | 1.4 | 2.8 | 1-butanol |
| C9BP | 0.16 | 72.6 | 0.8 | 2.2 | 1-butanol |
| 4,4'-BPDCA | 0.41 | 72.9 | 4.6 | 1.1 | Water[c] |

[a]Data on Pt-DPTZ/$CeO_2$ were previously published in reference [78].
[b]The catalyst was synthesized using a mixture of BPhen and DPTZ (1:2 molar ratio).
[c]4,4'-BPDCA was heated with water (to approximately 60° C.) to increase its solubility. The heat was turned off before adding Pt solution.

The Pt LCSCs were tested for a model hydrosilylation reaction between 1-octene (1) and dimethoxymethylsilane (2) (Scheme 2), under two conditions: 70° C. for 30 min and 60° C. for 20 min The former is the "standard condition" to evaluate active site recyclability. The latter is for TON (turn over number) calculations and activity comparison, as it keeps the conversion of 2 far below 100%. Toluene was selected as the solvent for the reaction. All catalysts, except Pt-4,4'-BPDCA/$CeO_2$, exhibit catalytic activity under both conditions, yielding the anti-Markovnikov addition product 3. Similar with most hydrosilylation catalysts, alkene isomerization and hydrogenation are unavoidable. Therefore, all reactions were performed with 1.2 eq. 1. The most concentrated by-products from 2 are silane oligomers 4 and 5, the concentration of which is very low compared with 3. In addition, no Markovnikov addition product is observed, suggesting the catalysts are highly selective. The conversion of 2 is difficult to quantify precisely due to its volatility, so the yield of 3 was used to quantify catalytic activity.

Activity of all fresh catalysts at 70° C., TON at 60° C. in the first 20 min, as well as total Pt recovery percentage (calculated from XPS Pt:Ce ratio) after 1 reaction cycle are reported in Table 2. Both catalytic activity and Pt recyclability vary significantly with the choice of ligand, highlighting one unique advantage of the metal-ligand strategy for supported SACs: metal sites can be tuned by changing the ligand, as in organometallic complexes in homogeneous catalysts.

Scheme 2. Hydrosilylation reaction between 1-octene (1) and dimethoxymethylsilane (2) used to test supported coordinated Pt catalysts, as well as structures of the two most important Si-containing by-products.

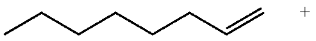

1

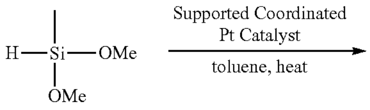

2

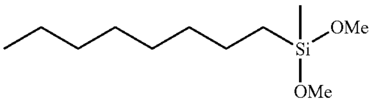

3

4

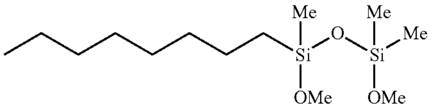

5

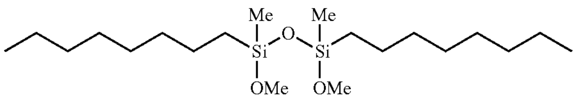

TABLE 2

Activity and total Pt recovery (by XPS) of Pt LCSCs.

| Ligand | Yield[a] (%) 70° C., 30 min | XPS Pt recovery[b] (%) 1 cycle | XPS Pt recovery[b] (%) 3 cycles | TON per Pt[c] 60° C., 20 min |
|---|---|---|---|---|
| DPTZ | 90[d] | 62 | — | 6200 |
| Bphen + DPTZ | 83 | 86 | 23 | 2200 |
| Bphen | 74 | 66 | — | 100 |
| C9BP | 51 | 27 | — | 10200 |
| 4,4'-BPDCA | 0 | 90 | — | 0 |

[a]Reaction condition: T = 70° C., t = 30 min, 30 mg catalyst, 6 mmol 1, 5 mmol 2, and 3 mL toluene.
[b]XPS Pt recovery was calculated based on Pt:Ce ratio compared with the fresh catalyst.
[c]Reaction condition: T = 60° C., t = 20 min, 15 mg catalyst, 3 mmol 1, 2.5 mmol 2, and 1.5 mL toluene.
[d]Complete conversion of 2 was achieved in this reaction.

2. Enhancing Recyclability of Pt-DPTZ/$CeO_2$ by Combination with Another Ligand An effort to improve active site recyclability of Pt-DPTZ SACs by mixing DPTZ with another ligand was undertaken. The mixing ligand should be soluble in 1-butanol, the only solvent found to dissolve DPTZ and $H_2PtCl_6.6H_2O$ simultaneously. BPhen was chosen over C9BP for this study because when used alone, BPhen stabilizes Pt better than C9BP according to Table 2. This is potentially due to the benzene rings on BPhen offering stronger van der Waals interaction with $CeO_2$ than alkyl chains on C9BP. Besides, the phenanthroline ring on BPhen is more rigid than the bi-pyridyl ring on C9BP, possibly providing a more favorable pocket for Pt binding. The synthesis procedure was adapted from the original Pt-DPTZ/$CeO_2$ recipe,[77] with a fraction of DPTZ replaced by BPhen. Two BPhen:DPTZ molar ratios: 2:1 and 1:2 were tested. The former does not create active hydrosilylation catalyst, so focus was on the latter, referred as Pt-BPhen+DPTZ/$CeO_2$.

Figure 5:
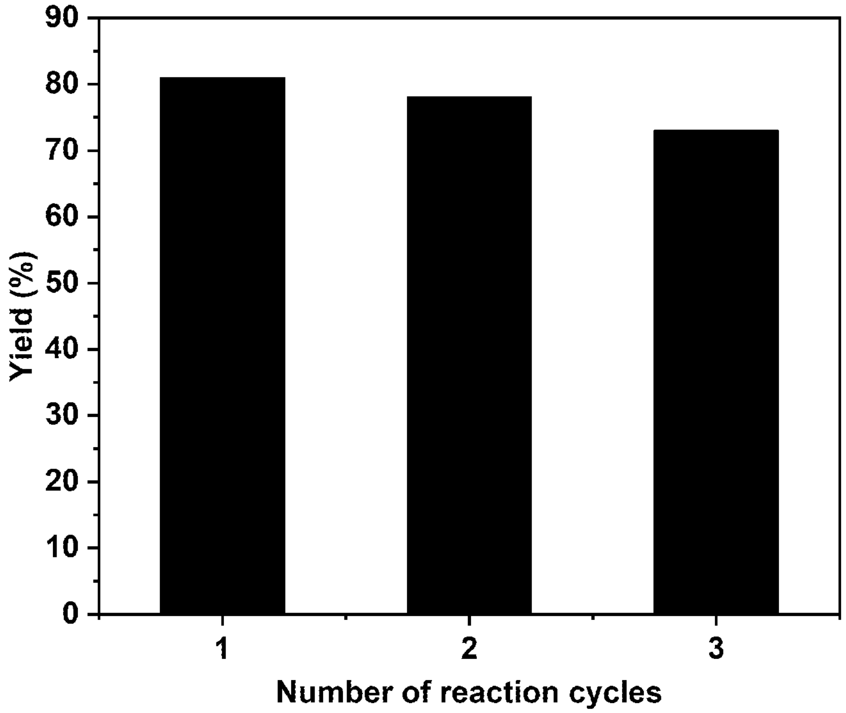
FIG. 5 depicts reusability test results of Pt-BPhen+DPTZ/$CeO_2$ (3 reaction cycles). Reaction condition: T=70° C., t=30 min, 30 mg catalyst, 6 mmol 1, 5 mmol 2, and 3 mL toluene. The catalyst can be reused multiple times without significant loss of activity.

Pt-Bphen+DPTZ/$CeO_2$ exhibits significantly improved reusability over Pt-DPTZ/$CeO_2$, as it only shows minimal activity drop in the first three cycles (81% yield to 73%, FIG. 5), while the product yield decreases quickly on Pt-DPTZ/$CeO_2$ once the conversion of 2 drops below 100%, due to active site leaching.[78] Pt recovery percentage after the first cycle is improved as well (86% compared with 62%, Table 2). It was recognized that Pt-BPhen+DPTZ/$CeO_2$ was not as active as Pt-DPTZ/$CeO_2$ (lower yield and TON per Pt under identical reaction conditions), but the difference is within a factor of three. In practice, one can compensate for lower activity by using more catalyst, but active site leaching is more challenging, especially for expensive noble metals. Therefore, from a practical perspective, significantly enhanced reusability is more valuable. For the hydrosilylation of epoxy-containing alkene (the reaction in Scheme 3), Pt-BPhen+DPTZ/$CeO_2$ shows similar selectivity (63%) with Pt-DPTZ/$CeO_2$ (71%) at 100% silane conversion (80° C., 100 min),[78] demonstrating desired stronger tolerance towards unstable groups than the Karstedt catalyst (~50% selectivity).42, 78 These results indicate that the mixed-ligand method offers a valid approach to alleviate the active site leaching problem. This strategy also provides another layer of tunability to the Pt sites as one can change catalyst properties by varying either ligand and the molar ratio between the two ligands.

Scheme 3. Hydrosilylation reaction between 4-vinyl-1-cyclohexane 1,2-epoxide and trimethylsilane.

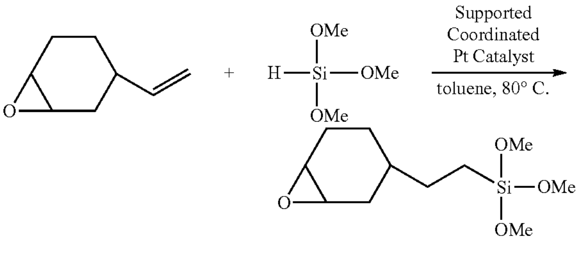

Figure 6:
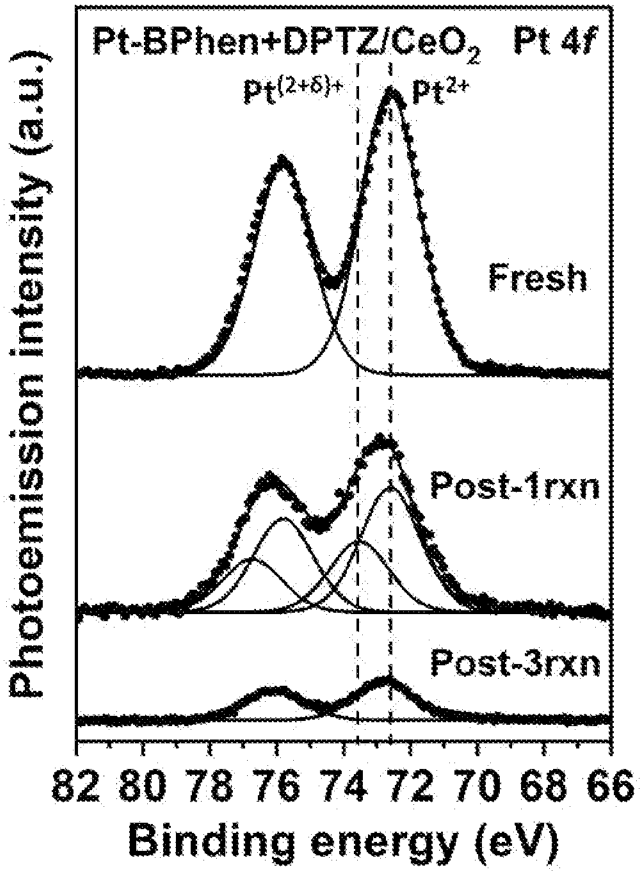
FIG. 6 provides fittings of Pt 4f XP spectra of Pt-BPhen+DPTZ/$CeO_2$, including its fresh form (top), after 1 reaction cycle (mid), and after 3 cycles (bottom). All spectra are normalized based on Ce 3d peak area so that the peak area reflects Pt concentration (Pt:Ce ratio) on the catalyst.
Figure 7:
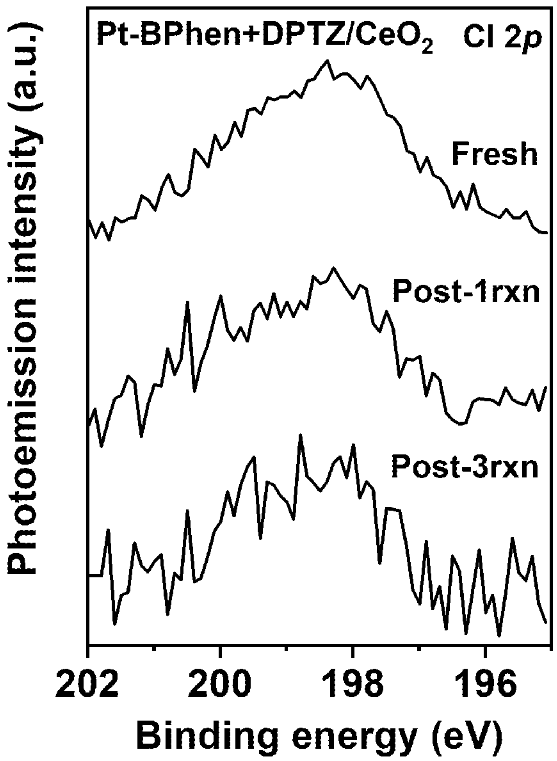
FIG. 7 provides XP spectra of Pt-BPhen+DPTZ/$CeO_2$, Cl 2p region, including its fresh form (top), after 1 reaction cycle (mid), and after 3 cycles (bottom). All spectra are normalized based on Pt 4f peak area so that peak size reflects the relative concentration of Cl with Pt (Cl:Pt ratio) on the catalyst. On Pt-BPhen+DPTZ/$CeO_2$, Cl:Pt drops after reactions (Table 3).
Figure 8:
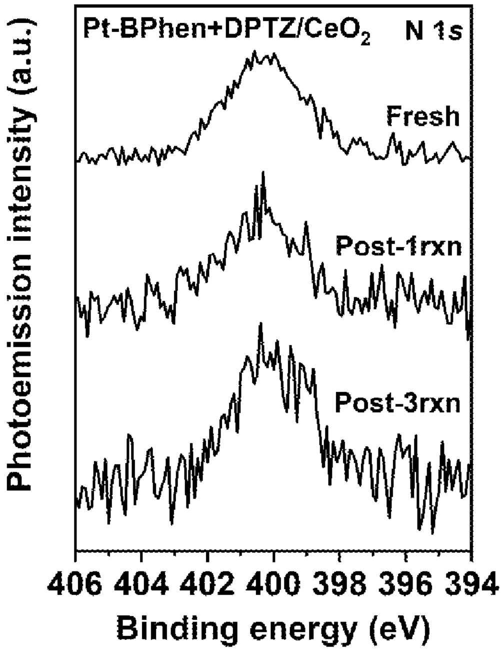
FIG. 8 provides XP spectra of Pt-BPhen+DPTZ/$CeO_2$, N is region, including its fresh form (top), after 1 reaction cycle (mid), and after 3 cycles (bottom). All spectra are normalized based on Pt 4f peak area so that peak size reflects the relative concentration of N with Pt (N:Pt ratio) on the catalyst. On Pt-BPhen+DPTZ/$CeO_2$, N:Pt ratio does not change much after reactions (Table 3).
Figure 9:
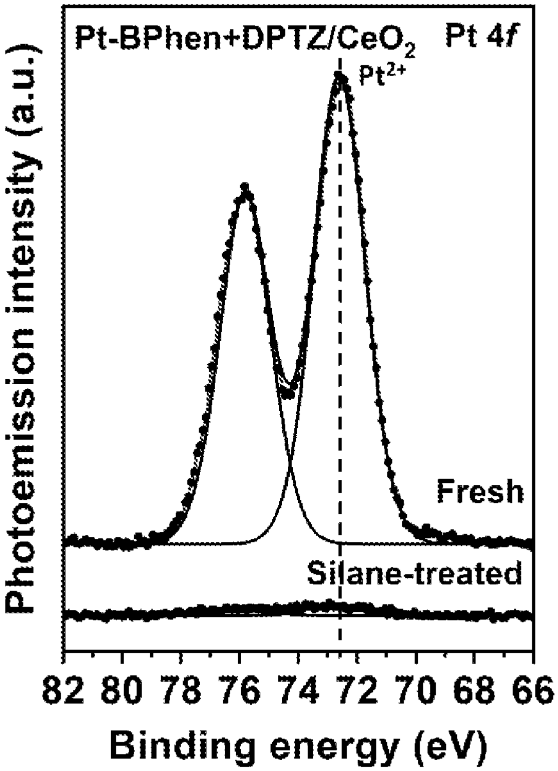
FIG. 9 provides XP spectra of Pt-BPhen+DPTZ/$CeO_2$ before and after silane treatment at 70° C. in Pt 4f region. Spectra are normalized based on Ce 3d peak area so that peak size reflects the concentration of Pt on the catalyst. After silane treatment, almost all Pt are etched off $CeO_2$.
Figure 10:
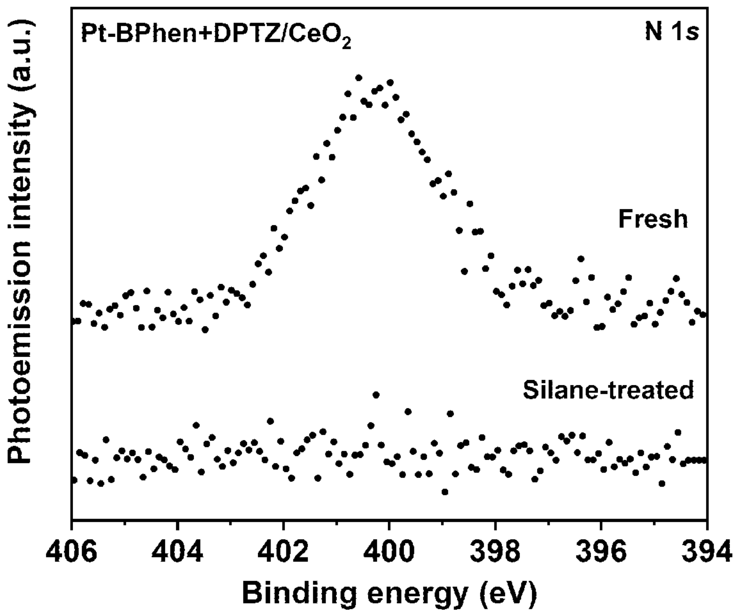
FIG. 10 provides XP spectra of Pt-BPhen+DPTZ/$CeO_2$ before and after silane treatment at 70° C. in N 1s region. Spectra are normalized based on Ce 3d peak area so that peak size reflects the concentration of N on the catalyst. After silane treatment, almost all N are etched off $CeO_2$.
Figure 11:
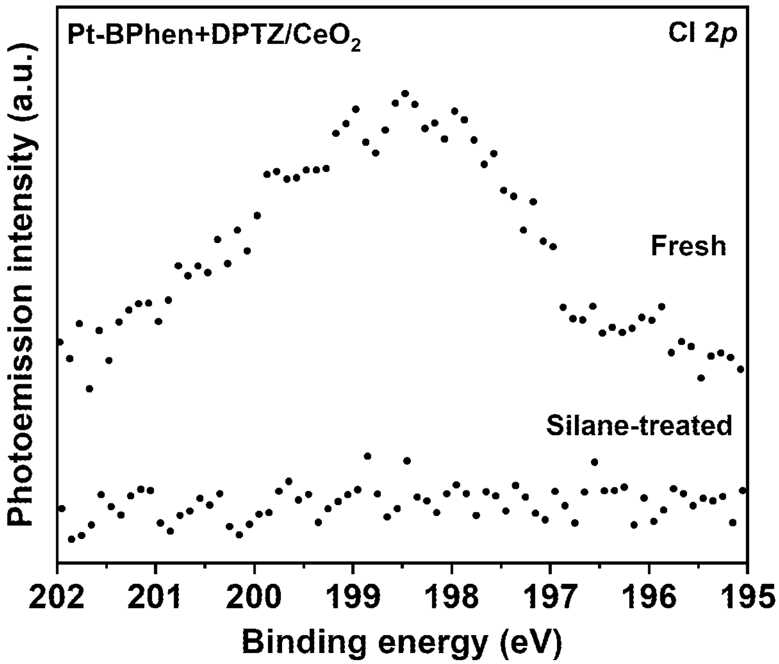
FIG. 11 depicts XP spectra of Pt-BPhen+DPTZ/$CeO_2$ before and after silane treatment at 70° C. in Cl 2p region. Spectra are normalized based on Ce 3d peak area so that peak size reflects the concentration of Cl on the catalyst. After silane treatment, almost all Cl are etched off $CeO_2$.

Post-reaction XPS shows that on Pt-BPhen+DPTZ, only a small fraction of Pt are the active sites. According to Table 2, total Pt leaching is significant after three cycles (23% total Pt recovery). Nevertheless, the activity remains almost constant in FIG. 5. This implies that the main active sites are retained, and leached Pt contribute little to the activity. FIGS. 2 and 6 show that fresh Pt-BPhen+DPTZ/$CeO_2$ has predominately $Pt^{2+}$ species. After the first cycle, Pt 4f peak shifts to slightly higher BE and the peak widens. Fitting reveals that some $Pt^{2+}$ are converted into $Pt^{(2+\delta)+}$ (FIG. 6, Table 3). After three cycles, both BE and FWHM of Pt 4f peak change back to values similar with the fresh catalyst, and the peak can again be described with a single $Pt^{2+}$ component. These results indicate that, the $Pt^{2+}$ on fresh Pt-BPhen+DPTZ/$CeO_2$ represents multiple species of similar oxidation states. During 3 reaction cycles, some are converted into $Pt^{(2+\delta)+}$ first and then leached away. Only a small fraction are highly stable, remaining on $CeO_2$ with unchanged oxidation state. However, they are much more catalytically active than other species, and hence the catalyst shows good reusability overall. Table 3 and FIG. 7 show that the decrease in Cl:Pt ratio after the reaction, which has been linked with Pt activation,[78] is observed on Pt-BPhen+DPTZ/$CeO_2$. N:Pt ratio does not decrease (Table 3, FIG. 8), highlighting the strong binding between Pt and the bidentate N pockets. It was also discovered that treating Pt-BPhen+DPTZ/$CeO_2$ with only 2 in toluene (without 1) at 70° C. leads to almost complete loss of Pt, N, Cl (FIGS. 9-11 respectively) and activity. Therefore, despite the main active $Pt^{2+}$ sites being highly recyclable under reaction conditions, interacting with silane without alkene induces complete leaching of Pt complexes.

TABLE 3

Changes in relative Pt concentrations of various oxidation states, N:Pt ratio, and Cl:Pt ratio on Pt-PDO/$CeO_2$ and Pt-BPhen + DPTZ/$CeO_2$

| | Relative concentration[a] | | | | | |
|---|---|---|---|---|---|---|
| Catalyst status | $Pt^{(2-\delta)+}$ | $Pt^{2+}$ | $Pt^{(2+\delta)+}$ | Total Pt | N:Pt | Cl:Pt |
| Fresh | 0 | 1 | 0 | 1 | 2.5 | 1.5 |
| post-1rxn | 0 | 0.55 | 0.31 | 0.86 | 2.7 | 1.1 |
| post-3rxn | 0 | 0.23 | 0 | 0.23 | 3 | 0.8 |

[a]Relative concentration of a Pt component on a sample was calculated based on the peak area from fittings (normalized to Ce 3d area of the same sample). For each catalyst, the total Pt 4f peak area of its fresh form was defined as 1.

3. Using Bidentate N-Based Ligands as "Anchoring Ligands"

The third strategy explored was to use a bidentate N-based ligand to modify oxide supports for Pt-DPTZ LCSCs. The synthesis procedure includes two steps: an "anchoring" ligand was first deposited onto an oxide to form a ligand-modified oxide. Then, Pt-DPTZ SACs were synthesized using a usual procedure,[77] with the anchoring-ligand-modified oxide as the support. Not to be limited by theory, it was hypothesized that the ligand-modified supports can enhance catalyst reusability because the anchoring ligand can offer stronger interactions with Pt than surface O from pristine oxides. The concept was tested using PDO and 4,4'-BPDCA as anchoring ligands on both $CeO_2$ and MgO (with similar surface area). The successful deposition of the anchoring ligand after the first step is verified by XPS N 1s peak area analysis (FIG. 12), with higher loading on $CeO_2$ than on MgO. Pt 4f XPS of both $CeO_2$-supported catalysts show predominantly $Pt^{2+}$ (FIG. 13), as on pristine $CeO_2$.[77] On both MgO-supported catalysts, the Pt 4f peak is wider and more asymmetric (low-binding-energy tail), compared to the $CeO_2$ catalysts, and fitting shows a small fraction of $Pt^0$ (FIG. 13), likely from small amount of Pt nanoparticles, which is not observed with Pt-DPTZ on pristine MgO.[77]

Figure 12:
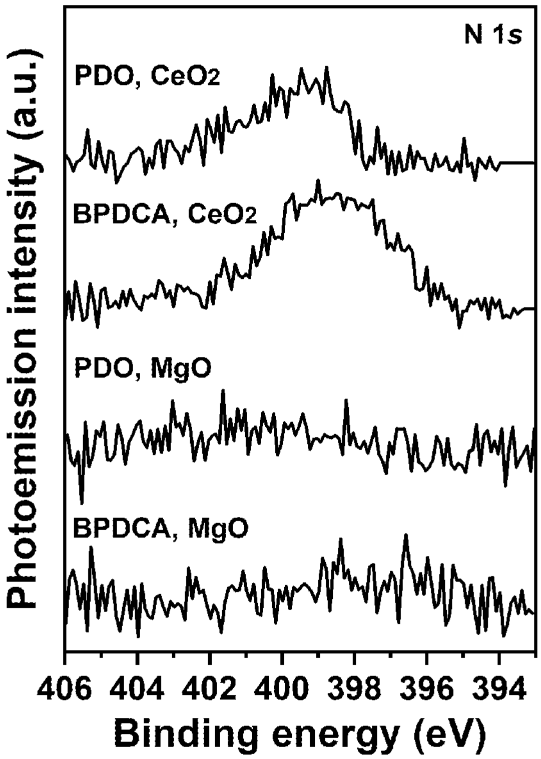
FIG. 12 depicts XP spectra of anchoring-ligand-modified oxide supports in N is region. Each spectrum is labeled as "anchoring ligand, support". On modified $CeO_2$, N 1s peaks are large, suggesting high coverages of ligands. In comparison, on modified MgO, N is peaks are so small that it can barely be distinguished from background noises, indicating much lower coverages.
Figure 13:
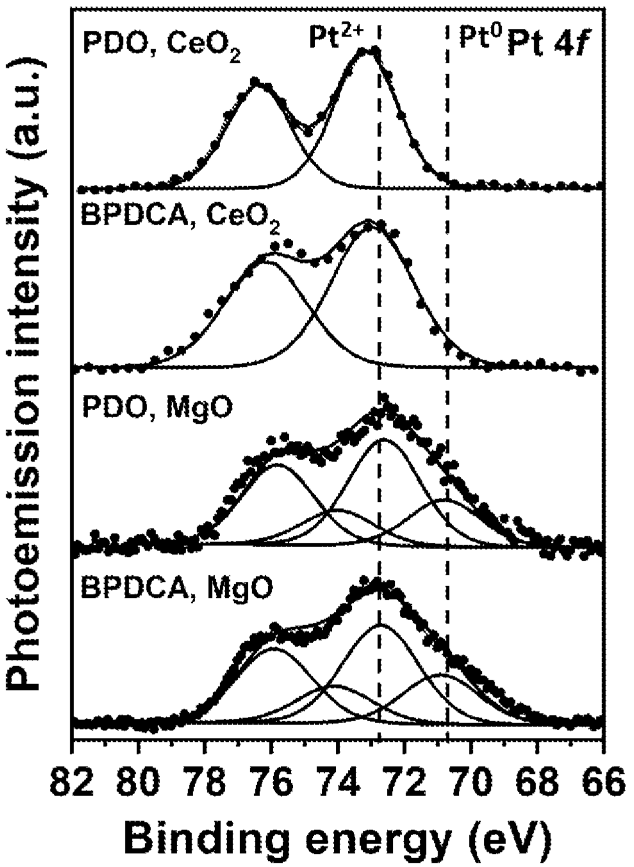
FIG. 13 provide fittings of Pt 4f XP spectra of Pt-DPTZ LCSCs supported on an oxide ($CeO_2$ or MgO) modified by an anchoring ligand (PDO or 4,4'-BPDCA). Each spectrum is labeled as "anchoring ligand, support", and BPDCA refers to 4,4'-BPDCA. All spectra are normalized so that peaks are of similar intensity for better peak shape comparison. Pt exist predominantly as $Pt^{2+}$ on modified $CeO_2$, while a small fraction of $Pt^0$ is observed on modified MgO.

The activity and Pt recyclability of these catalysts are reported in Table 4. The enhancement in Pt recyclability by the anchoring ligand is clearly observed on both supports, as Pt recovery increases on ligand-modified supports compared with pristine supports. Meanwhile, activity drops, the extent of which varies. Despite the activity loss, Table 4 shows that when the proper anchoring ligand and support are used (PDO and $CeO_2$), this strategy can create Pt-DPTZ LCSCs with significantly improved Pt recyclability (from 62% to 82%) while maintaining acceptable activity (68% yield at 70° C. for 30 min). Therefore, the anchoring ligand method is a promising approach. Pt recyclability is better on $CeO_2$ than on MgO, likely due to the higher anchoring ligand coverage $CeO_2$ (FIG. 12).

TABLE 4

Activity and total Pt recovery (after 1 reaction cycle) of Pt-DPTZ SACs supported on anchoring-ligand-modified oxides

| Support | Anchoring ligand | Yield (%) | XPS Pt recovery (%) |
|---|---|---|---|
| $CeO_2$[a] | No anchoring ligand | 90[c, d] | 62 |
| | PDO | 68 | 82 |
| | 4,4'-BPDCA | 0 | 91 |
| MgO[b] | No anchoring ligand | 95[c, d] | 32 |
| | PDO | 49 | 36 |
| | 4,4'-BPDCA | 93[c] | 47 |

[a]Reaction condition: T = 70° C., t = 30 min, 30 mg catalyst, 6 mmol 1, 5 mmol 2, and 3 mL toluene.
[b]Reaction condition: T = 75° C., t = 120 min, 30 mg catalyst, 6 mmol 1, 5 mmol 2, and 3 mL toluene.
[c]Complete conversion of 2 was achieved in these reactions.
[d]Data on Pt-DPTZ SACs were previously published in reference 78.

Figure 14:
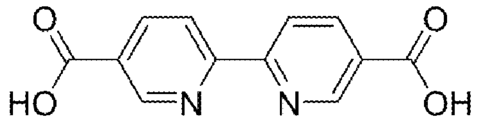
FIG. 14 depicts structures of control ligands used in this work: (a) 2,2'-bipyridine-5,5'-dicarboxylic acid (5,5'-BPDCA), and (b) trifluoroacetic acid (TFAA).
Figure 14:
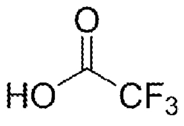

It was noted that in some cases, the activity loss with the anchoring ligand is too significant. For example, 4,4'-BPDCA leads to complete deactivation of Pt-DPTZ SACs on $CeO_2$. 5,5'-BPDCA, another ligand with the same functional groups but at different positions (FIG. 14*a*), does the same. Control experiment shows that modifying $CeO_2$ with trifluoroacetic acid (FIG. 14*b*), a ligand with a —COOH group but without the bidentate N pocket to anchor Pt-DPTZ, does not completely deactivate the catalyst. Consequently, the deactivation cannot be simply attributed to —COOH groups occupying certain catalytically relevant sites on $CeO_2$, such as oxygen defects. Not to be limited by theory, it is suspected that the deactivation might be related to strong interactions between —COOH groups and $CeO_2$ forcing BPDCA to stand up, pushing Pt away from the support. The loss of Pt-support interaction may impact the electronic structure of Pt enough to deactivate the site. It has been demonstrated previously that surface O temporarily detach from Pt during catalysis, acting as "reversible leaving groups,"[78] so the lack of Pt-support binding may also reduce the number of leaving groups, so that the Pt is over-coordinated. The sensitivity of the metal center to the local coordination environment is a topic of ongoing study and interest.

Conclusions

A series of ligand-coordinated supported Pt hydrosilylation catalysts with various bidentate N-based ligands, designed to improve catalyst recyclability over previous Pt-DPTZ SACs are reported. These heterogeneous catalysts mostly contain highly dispersed $Pt^{2+}$ sites, and are active for alkene hydrosilylation under mild conditions with high selectivity. It has been demonstrated there are three approaches to alleviate the active site leaching problem on the original Pt-DPTZ SACs. First, by replacing DPTZ with a ligand containing additional functional groups that offer interactions with oxide supports, two active Pt hydrosilylation catalysts in Pt-BPhen/$CeO_2$ and Pt-C9BP/$CeO_2$ were developed. In addition, a material was discovered, Pt-4'4-BPDCA/$CeO_2$, which can recycle Pt much more effectively but lacks catalytic activity. Second, it was discovered that mixing DPTZ with BPhen leads to a highly reusable catalyst, Pt-BPhen+DPTZ/$CeO_2$, which shows only 10% activity loss after three reaction cycles, due to a $Pt^{2+}$ species that is highly active and stable, despite accounting for only a small fraction of total Pt. Finally, it was demonstrated that modifying oxide supports with an anchoring ligand, either PDO or 4'4-BPDCA, enhances Pt recyclability on Pt-DPTZ SACs supported on either $CeO_2$ or MgO. All three strategies are promising to enhance reusability of supported Pt-ligand single-atom hydrosilylation catalysts, while maintaining high activity and selectivity. Meanwhile, new development in synthesis methods reported here also expands future opportunities to fine-tune metal centers in these catalysts towards desired properties.

REFERENCES

1. Sommer, L.; Pietrusza, E.; Whitmore, F., Peroxide-catalyzed addition of trichlorosilane to 1-octene. *J. Am. Chem. Soc.* 1947, 69, 188-188.
2. Pierce, 0. R.; Kim, Y. K., Fluorosilicones as high temperature elastomers. *Rubber Chem. Technol.* 1971, 44, 1350-1362.
3. Marciniec, B.; Walczuk, E.; Blazejewska-Chadyniak, P.; Chadyniak, D.; Kujawa-Welten, M.; Krompiec, S.; Auner, N.; Weiss, J., Organosilicon Chemistry V—From Molecules to Materials. *Wiley VCH, Weinheim* 2003.
4. Morita, Y.; Tajima, S.; Suzuki, H.; Sugino, H., Thermally initiated cationic polymerization and properties of epoxy siloxane. *J. Appl. Polym. Sci.* 2006, 100, 2010-2019.
5. Beyou, E.; Babin, P.; Bennetau, B.; Dunogues, J.; Teyssie, D.; Boileau, S., New fluorinated polysiloxanes containing an ester function in the spacer. I. Synthesis and characterization. *J. Polym. Sci., Part A: Polym. Chem.* 1994, 32, 1673-1681.
6. Iojoiu, C.; Abadie, M. J.; Harabagiu, V.; Pinteala, M.; Simionescu, B. C., Synthesis and photocrosslinking of benzyl acrylate substituted polydimethylsiloxanes. *Eur. Polym. J.* 2000, 36, 2115-2123.
7. Li, Z.; Qin, J.; Yang, Z.; Ye, C., Synthesis and structural characterization of a new polysiloxane with second-order nonlinear optical effect. *J. Appl. Polym. Sci.* 2004, 94, 769-774.
8. Sellinger, A.; Laine, R. M.; Chu, V.; Viney, C., Palladium- and platinum-catalyzed coupling reactions of allyloxy aromatics with hydridosilanes and hydridosiloxanes: Novel liquid crystalline/organosilane materials. *J. Polym. Sci., Part A: Polym. Chem.* 1994, 32, 3069-3089.
9. Drazkowski, D. B.; Lee, A.; Haddad, T. S.; Cookson, D. J., Chemical substituent effects on morphological transitions in styrene-butadiene-styrene triblock copolymer grafted with polyhedral oligomeric silsesquioxanes. *Macromolecules* 2006, 39, 1854-1863.
10. Tuchbreiter, A.; Werner, H.; Gade, L. H., "A posteriori" modification of carbosilane dendrimers and dendrons: their activation in core and branch positions. *Dalton Trans.* 2005, 1394-1402.
11. Maciejewski, H.; Wawrzyńczak, A.; Dutkiewicz, M.; Fiedorow, R., Silicone waxes—synthesis via hydrosilylation in homo-and heterogeneous systems. *J. Mol. Catal. A: Chem.* 2006, 257, 141-148.
12. Troegel, D.; Stohrer, J., Recent advances and actual challenges in late transition metal catalyzed hydrosilylation of olefins from an industrial point of view. *Coord. Chem. Rev.* 2011, 255, 1440-1459.
13. Marciniec, B., *Hydrosilylation: a comprehensive review on recent advances*; Springer Science & Business Media, 2008; Vol. 1.
14. Ganicz, T.; Pakula, T.; Stańczyk, W. A., Novel liquid crystalline resins based on MQ siloxanes. *J. Organomet. Chem.* 2006, 691, 5052-5055.
15. Boury, B.; Corriu, R. J.; Leclercq, D.; Mutin, P. H.; Planeix, J. M.; Vioux, A., Poly (vinylsilane): a precursor to silicon carbide. 1. Preparation and characterization. *Organometallics* 1991, 10, 1457-1461.
16. Mori, A.; Sato, H.; Mizuno, K.; Hiyama, T.; Shintani, K.; Kawakami, Y., A facile preparation and polymerization of 1, 1-difunctionalized disiloxanes. *Chem. Lett.* 1996, 25, 517-518.
17. O'brien, M. J., Polyether siloxane copolymer network compositions. U.S. Pat. No. 6,531,540: 2003.
18. Herzig, C.; Deubzer, B.; Huettner, D., Siloxane copolymers containing alkenyl groups, their preparation and use. U.S. Pat. No. 5,241,034: 1993.
19. Jyono, H.; Odaka, H.; Ito, H.; Iwakiri, H., Curable composition. U.S. Pat. No. 6,444,775: 2002.
20. Watabe, T.; Matsumoto, T.; Onoguchi, T.; Tsuruoka, K., Room temperature-setting compositions. U.S. Pat. No. 6,207,766: 2001.
21. Jerschow, P., *Silicone elastomers*; Smart Publications, 2001; Vol. 137.
22. Morris, R. H., Asymmetric hydrogenation, transfer hydrogenation and hydrosilylation of ketones catalyzed by iron complexes. *Chem. Soc. Rev.* 2009, 38, 2282-2291.
23. Langlotz, B. K.; Wadepohl, H.; Gade, L. H., Chiral bis (pyridylimino) isoindoles: A highly modular class of pincer ligands for enantioselective catalysis. *Angew. Chem. Int. Ed.* 2008, 47, 4670-4674.
24. Bart, S. C.; Lobkovsky, E.; Chirik, P. J., Preparation and molecular and electronic structures of iron (0) dinitrogen and silane complexes and their application to catalytic hydrogenation and hydrosilation. *J. Am. Chem. Soc.* 2004, 126, 13794-13807.
25. Vankelecom, I.; Jacobs, P., Dense organic catalytic membranes for fine chemical synthesis. *Catal. Today* 2000, 56, 147-157.
26. Xue, M.; Li, J.; Peng, J.; Bai, Y.; Zhang, G.; Xiao, W.; Lai, G., Effect of triarylphosphane ligands on the rhodium-catalyzed hydrosilylation of alkene. *Appl. Organomet. Chem.* 2014, 28, 120-126.
27. Igarashi, M.; Matsumoto, T.; Kobayashi, T.; Sato, K.; Ando, W.; Shimada, S.; Hara, M.; Uchida, H., Ir-catalyzed hydrosilylation reaction of allyl acetate with octakis (dimethylsiloxy) octasilsesquioxane and related hydrosilanes. *J. Organomet. Chem.* 2014, 752, 141-146.
28. Dong, H.; Jiang, Y.; Berke, H., Rhenium-mediated dehydrogenative silylation and highly regioselective hydrosilylation of nitrile substituted olefins. *J. Organomet. Chem.* 2014, 750, 17-22.
29. Wu, J. Y.; Stanzl, B. N.; Ritter, T., A strategy for the synthesis of well-defined iron catalysts and application to regioselective diene hydrosilylation. *J. Am. Chem. Soc.* 2010, 132, 13214-13216.
30. Glaser, P. B.; Tilley, T. D., Catalytic hydrosilylation of alkenes by a ruthenium silylene complex. Evidence for a new hydrosilylation mechanism. *J. Am. Chem. Soc.* 2003, 125, 13640-13641.
31. Nozakura, S.; Konotsune, S., Cyanoethylation of Trichlorosilane. II. α-Addition. *Bull. Chem. Soc. Jpn.* 1956, 29, 326-331.

32. Bareille, L.; Becht, S.; Cui, J. L.; Le Gendre, P.; Moïse, C., First Titanium-Catalyzed a nti-1, 4-Hydrosilylation of Dienes. *Organometallics* 2005, 24, 5802-5806.
33. Harder, S.; Brettar, J., Rational Design of a Well-Defined Soluble Calcium Hydride Complex. *Angew. Chem. Int. Ed.* 2006, 45, 3474-3478.
34. Leich, V.; Spaniol, T. P.; Maron, L.; Okuda, J., Hydrosilylation catalysis by an earth alkaline metal silyl: synthesis, characterization, and reactivity of bis (triphenylsilyl) calcium. *Chem. Commun.* 2014, 50, 2311-2314.
35. Speier, J. L.; Webster, J. A.; Barnes, G. H., The addition of silicon hydrides to olefinic double bonds. Part II. The use of group VIII metal catalysts. *J. Am. Chem. Soc.* 1957, 79, 974-979.
36. Karstedt, B., Platinum complexes of unsaturated siloxanes and platinum containing organopolysiloxanes. U.S. Pat. No. 3,775,452: 1973.
37. Galeandro-Diamant, T.; Zanota, M.-L.; Sayah, R.; Veyre, L.; Nikitine, C.; de Bellefon, C.; Marrot, S.; Meille, V.; Thieuleux, C., Platinum nanoparticles in suspension are as efficient as Karstedt's complex for alkene hydrosilylation. *Chem. Commun.* 2015, 51, 16194-16196.
38. Chauhan, B. P.; Rathore, J. S., Regioselective Synthesis of Multifunctional Hybrid Polysiloxanes Achieved by Pt—Nanocluster Catalysis. *J. Am. Chem. Soc.* 2005, 127, 5790-5791.
39. Bai, Y.; Zhang, S.; Deng, Y.; Peng, J.; Li, J.; Hu, Y.; Li, X.; Lai, G., Use of functionalized PEG with 4-aminobenzoic acid stabilized platinum nanoparticles as an efficient catalyst for the hydrosilylation of alkenes. *J. Colloid Interface Sci.* 2013, 394, 428-433.
40. Stein, J.; Lewis, L.; Gao, Y.; Scott, R., In situ determination of the active catalyst in hydrosilylation reactions using highly reactive Pt (0) catalyst precursors. *J. Am. Chem. Soc.* 1999, 121, 3693-3703.
41. Meister, T. K.; Riener, K.; Gigler, P.; Stohrer, J. r.; Herrmann, W. A.; Kühn, F. E., Platinum Catalysis Revisited—Unraveling Principles of Catalytic Olefin Hydrosilylation. *ACS Catal.* 2016, 6, 1274-1284.
42. Markó, I. E.; Sterin, S.; Buisine, O.; Mignani, G.; Branlard, P.; Tinant, B.; Declercq, J.-P., Selective and efficient platinum (0)-carbene complexes as hydrosilylation catalysts. *Science* 2002, 298, 204-206.
43. Marko, I. E.; Sterin, S.; Buisine, O.; Berthon, G.; Michaud, G.; Tinant, B.; Declercq, J. P., Highly Active and Selective Platinum (0)-Carbene Complexes. Efficient, Catalytic Hydrosilylation of Functionalised Olefins. *Adv. Synth. Catal.* 2004, 346, 1429-1434.
44. Bernhammer, J. C.; Huynh, H. V., Platinum (II) complexes with thioether-functionalized benzimidazolin-2-ylidene ligands: Synthesis, structural characterization, and application in hydroelementation reactions. *Organometallics* 2013, 33, 172-180.
45. Dunsford, J. J.; Cavell, K. J.; Kariuki, B., Expanded ring N-heterocyclic carbene complexes of zero valent platinum dvtms (divinyltetramethyldisiloxane): Highly efficient hydrosilylation catalysts. *J. Organomet. Chem.* 2011, 696, 188-194.
46. Taige, M. A.; Ahrens, S.; Strassner, T., Platinum (II)-bis-(N-heterocyclic carbene) complexes: synthesis, structure and catalytic activity in the hydrosilylation of alkenes. *J. Organomet. Chem.* 2011, 696, 2918-2927.
47. Marciniec, B.; Posala, K.; Kownacki, I.; Kubicki, M.; Taylor, R., New Bis (dialkynyldisiloxane) triplatinum (0) cluster: synthesis, structure, and catalytic activity in olefin-hydrosilylation reactions. *ChemCatChem* 2012, 4, 1935-1937.
48. Downing, C. M.; Kung, H. H., Diethyl sulfide stabilization of platinum-complex catalysts for hydrosilylation of olefins. *Catal. Commun.* 2011, 12, 1166-1169.
49. Sabourault, N.; Mignani, G.; Wagner, A.; Mioskowski, C., Platinum oxide (PtO2): a potent hydrosilylation catalyst. *Org. Lett.* 2002, 4, 2117-2119.
50. Chen, Y. J.; Ji, S. F.; Sun, W. M.; Chen, W. X.; Dong, J. C.; Wen, J. F.; Zhang, J.; Li, Z.; Zheng, L. R.; Chen, C.; Peng, Q.; Wang, D. S.; Li, Y. D., Discovering Partially Charged Single-Atom Pt for Enhanced Anti-Markovnikov Alkene Hydrosilylation. *J. Am. Chem. Soc.* 2018, 140, 7407-7410.
51. Zhu, Y.; Cao, T.; Cao, C.; Luo, J.; Chen, W.; Zheng, L.; Dong, J.; Zhang, J.; Han, Y.; Li, Z.; Chen, C.; Peng, Q.; Wang, D.; Li, Y., One-Pot Pyrolysis to N-Doped Graphene with High-Density Pt Single Atomic Sites as Heterogeneous Catalyst for Alkene Hydrosilylation. *ACS Catal.* 2018, 8, 10004-10011.
52. Cui, X.; Junge, K.; Dai, X.; Kreyenschulte, C.; Pohl, M.-M.; Wohlrab, S.; Shi, F.; Bruckner, A.; Beller, M., Synthesis of Single Atom Based Heterogeneous Platinum Catalysts: High Selectivity and Activity for Hydrosilylation Reactions. *ACS Central Science* 2017, 3, 580-585.
53. Mantovani, K. M.; Stival, J. F.; Wypych, F.; Bach, L.; Zamora, P. G. P.; Rocco, M. L.; Nakagaki, S., Unusual catalytic activity after simultaneous immobilization of two metalloporphyrins on hydrozincite/nanocrystalline anatase. *J. Catal.* 2017, 352, 442-451.
54. Rimoldi, M.; Fodor, D.; van Bokhoven, J. A.; Mezzetti, A., A stable 16-electron iridium(III) hydride complex grafted on SBA-15: a single-site catalyst for alkene hydrogenation. *Chem. Comm.* 2013, 49, 11314-11316.
55. Xu, W.; Li, Y.; Yu, B.; Yang, J.; Zhang, Y.; Chen, X.; Zhang, G.; Gao, Z., Ligand-tailored single-site silica supported titanium catalysts: Synthesis, characterization and towards cyanosilylation reaction. *J. Solid State Chem.* 2015, 221,
56. Chen, L.; Rangan, S.; Li, J.; Jiang, H.; Li, Y., A molecular Pd (II) complex incorporated into a MOF as a highly active single-site heterogeneous catalyst for C—Cl bond activation. *Green Chemistry* 2014, 16, 3978-3985.
57. Huang, Z.; Gu, X.; Cao, Q.; Hu, P.; Hao, J.; Li, J.; Tang, X., Catalytically Active Single-Atom Sites Fabricated from Silver Particles. *Angew. Chem.* 2012, 124, 4274-4279.
58. Fako, E.; Lodziana, Z.; Lopez, N., Comparative single atom heterogeneous catalysts (SAHCs) on different platforms: a theoretical approach. *Catal. Sci. Technol.* 2017, 7, 4285-4293.
59. Chen, Y. X.; Huang, Z. W.; Ma, Z.; Chen, J. M.; Tang, X. F., Fabrication, characterization, and stability of supported single-atom catalysts. *Catalysis Science & Technology* 2017, 7, 4250-4258.
60. Vile, G.; Albani, D.; Nachtegaal, M.; Chen, Z.; Dontsova, D.; Antonietti, M.; Lopez, N.; Perez-Ramirez, J., A Stable Single-Site Palladium Catalyst for Hydrogenations. *Angew. Chem. Int. Ed.* 2015, 54, 11265-11269.
61. Xu, W.; Yu, B.; Zhang, Y.; Chen, X.; Zhang, G.; Gao, Z., Single-site SBA-15 supported zirconium catalysts. Synthesis, characterization and toward cyanosilylation reaction. *Appl. Surf. Sci.* 2015, 325, 227-234.
62. Ji, P.; Manna, K.; Lin, Z.; Urban, A.; Greene, F. X.; Lan, G.; Lin, W., Single-Site Cobalt Catalysts at New Zr8 (μ2-O)8 (μ2-OH)4 Metal-Organic Framework Nodes for Highly Active Hydrogenation of Alkenes, Imines, Carbonyls, and Heterocycles. *J. Am. Chem. Soc.* 2016, 138, 12234-12242.

63. Schweitzer, N. M.; Hu, B.; Das, U.; Kim, H.; Greeley, J.; Curtiss, L. A.; Stair, P. C.; Miller, J. T.; Hock, A. S., Propylene Hydrogenation and Propane Dehydrogenation by a Single-Site Zn2+ on Silica Catalyst. *ACS Catal.* 2014, 4, 1091-1098.
64. Sohn, H.; Camacho-Bunquin, J.; Langeslay, R.; Ignacio-de Leon, P.; Niklas, J.; Poluektov, O.; Liu, C.; Connell, J.; Yang, D.; Kropf, J., Isolated, well-defined organovanadium (III) on silica: single-site catalyst for hydrogenation of alkenes and alkynes. *Chem. Commun.* 2017.
65. Qiao, B.; Wang, A.; Yang, X.; Allard, L. F.; Jiang, Z.; Cui, Y.; Liu, J.; Li, J.; Zhang, T., Single-atom catalysis of CO oxidation using Pt1/FeOx. *Nature chemistry* 2011, 3, 634-641.
66. Li, Z.; Ji, S.; Liu, Y.; Cao, X.; Tian, S.; Chen, Y.; Niu, Z.; Li, Y., Well-Defined Materials for Heterogeneous Catalysis: From Nanoparticles to Isolated Single-Atom Sites. *Chem. Rev.* 2019.
67. DeRita, L.; Dai, S.; Lopez-Zepeda, K.; Pham, N.; Graham, G. W.; Pan, X.; Christopher, P., Catalyst Architecture for Stable Single Atom Dispersion Enables Site-Specific Spectroscopic and Reactivity Measurements of CO Adsorbed to Pt Atoms, Oxidized Pt Clusters, and Metallic Pt Clusters on TiO2. *J. Am. Chem. Soc.* 2017, 139, 14150-14165.
68. Liu, J., Catalysis by Supported Single Metal Atoms. *ACS Catal.* 2017, 7, 34-59.
69. Cui, X.; Li, W.; Ryabchuk, P.; Junge, K.; Beller, M., Bridging homogeneous and heterogeneous catalysis by heterogeneous single-metal-site catalysts. *Nat. Catal.* 2018, 1, 385-397.
70. Liu, L.; Meira, D. M.; Arenal, R.; Concepcion, P.; Puga, A. V.; Corma, A., Determination of the Evolution of Heterogeneous Single Metal Atoms and Nanoclusters under Reaction Conditions: Which Are the Working Catalytic Sites? *ACS Catal.* 2019, 10626-10639.
71. Skomski, D.; Tempas, C. D.; Cook, B. J.; Polezhaev, A. V.; Smith, K. A.; Caulton, K. G.; Tait, S. L., Two- and Three-Electron Oxidation of Single-Site Vanadium Centers at Surfaces by Ligand Design. *J. Am. Chem. Soc.* 2015, 137, 7898-7902.
72. Skomski, D.; Tempas, C. D.; Bukowski, G. S.; Smith, K. A.; Tait, S. L., Redox-active on-surface polymerization of single-site divalent cations from pure metals by a ketone-functionalized phenanthroline. *J. Chem. Phys.* 2015, 142, 101913.
73. Skomski, D.; Tempas, C. D.; Smith, K. A.; Tait, S. L., Redox-Active On-Surface Assembly of Metal-Organic Chains with Single-Site Pt(II). *J. Am. Chem. Soc.* 2014, 136, 9862-9865.
74. Tempas, C. D.; Skomski, D.; Cook, B. J.; Le, D.; Smith, K. A.; Rahman, T. S.; Caulton, K. G.; Tait, S. L., Redox Isomeric Surface Structures Are Preferred over Odd-Electron Pt1+. *Chem. Eur. J.* 2018, 24, 15852-15858.
75. Williams, C. G.; Wang, M.; Skomski, D.; Tempas, C. D.; Kesmodel, L. L.; Tait, S. L., Metal-Ligand Complexation through Redox Assembly at Surfaces Characterized by Vibrational Spectroscopy. *J. Phys. Chem. C* 2017.
76. Morris, T. W.; Huerfano, I. J.; Wang, M.; Wisman, D. L.; Cabelof, A. C.; Din, N. U.; Tempas, C. D.; Le, D.; Polezhaev, A. V.; Rahman, T. S.; Caulton, K. G.; Tait, S. L., Multi-electron Reduction Capacity and Multiple Binding Pockets in Metal—Organic Redox Assembly at Surfaces. *Chem. Eur. J.* 2019, 25, 5565-5573.
77. Chen, L.; Sterbinsky, G. E.; Tait, S. L., Synthesis of platinum single-site centers through metal-ligand self-assembly on powdered metal oxide supports. *J. Catal.* 2018, 365, 303-312.
78. Chen, L.; Ali, I. S.; Sterbinsky, G. E.; Gamier, J. T. L.; Skrabalak, S. E.; Tait, S. L., Alkene Hydrosilylation on Oxide-Supported Pt-Ligand Single-Site Catalysts. *ChemCatChem* 2019, 11, 2843-2854.
79. Chen, L.; Agrawal, V.; Tait, S. L., Sulfate promotion of selective catalytic reduction of nitric oxide by ammonia on ceria. *Catalysis Science & Technology* 2019, 9, 1802-1815.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A supported platinum catalyst comprising:

(i) a di-nitrogen ligand, (ii) a support comprising MgO, and (iii) an anchoring ligand, wherein the di-nitrogen ligand is of formula (I):

(I)

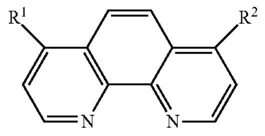

wherein $R^1$ and $R^2$ are each, independently, a $C_3$ to a $C_{12}$ branched or unbranched alkyl group, a substituted or unsubstituted phenyl group, or a carboxylic acid group;

wherein the anchoring ligand is 2,2'-bipyridine-4,4'-dicarboxylic acid or 1,10-phenanthroline-5,6-dione;

wherein the di-nitrogen ligand in (i) and the anchoring ligand in (iii) complex with a platinum metal ion; and wherein the anchoring ligand in (iii) is deposited on the support in (ii).

2. The supported platinum catalyst system of claim 1, wherein $R^1$ and $R^2$ are both an unbranched $C_9$ alkyl group.

3. The supported platinum catalyst system of claim 1, wherein $R^1$ and $R^2$ are both carboxylic acid.

4. The supported platinum catalyst of claim 1, wherein the di-nitrogen ligand of formula (I) is:

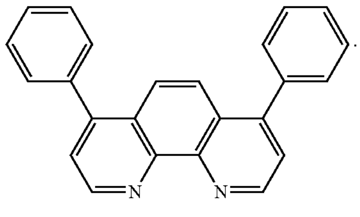 [SMILES: c1ccc(-c2ccnc3c2ccc2c(-c4ccccc4)ccnc23)cc1].

5. A process comprising:

(a) providing a supported catalyst system of claim 1;

(b) contacting the supported catalyst system, a vinyl terminated alkene and a hydrosilylation agent under hydrosilylation conditions; and (c) hydrosilylating the vinyl terminated alkene to form a hydrosilylated alkyl product.

6. The process of claim 5, wherein the vinyl terminated alkene is 1-octene.

7. The process of claim 5, wherein the hydrosilylation agent comprises dimethoxymethylsilane.

* * * * *